United States Patent
Choi et al.

(10) Patent No.: US 7,835,908 B2
(45) Date of Patent: Nov. 16, 2010

(54) METHOD AND APPARATUS FOR ROBUST SPEAKER LOCALIZATION AND AUTOMATIC CAMERA STEERING SYSTEM EMPLOYING THE SAME

(75) Inventors: Changkyu Choi, Seoul (KR); Donggeon Kong, Busan-si (KR); Bonyoung Lee, Gyeonggi-do (KR); Sookwon Rang, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1340 days.

(21) Appl. No.: 10/962,516

(22) Filed: Oct. 13, 2004

(65) Prior Publication Data

US 2005/0080619 A1    Apr. 14, 2005

(51) Int. Cl.
*G10L 15/20* (2006.01)
(52) U.S. Cl. .................. 704/233; 704/208; 704/215
(58) Field of Classification Search .............. None
See application file for complete search history.

(56) References Cited

U.S. PATENT DOCUMENTS

| | | | | |
|---|---|---|---|---|
| 6,157,403 A | * | 12/2000 | Nagata | 348/171 |
| 6,289,309 B1 | * | 9/2001 | deVries | 704/233 |
| 6,469,732 B1 | * | 10/2002 | Chang et al. | 348/14.08 |
| 7,130,797 B2 | * | 10/2006 | Beaucoup et al. | 704/233 |
| 2002/0198709 A1 | * | 12/2002 | Takagi | 704/233 |
| 2003/0058153 A1 | * | 3/2003 | Yu | 342/17 |
| 2004/0037436 A1 | * | 2/2004 | Rui | 381/92 |

FOREIGN PATENT DOCUMENTS

| | | |
|---|---|---|
| JP | 5-111020 | 4/1993 |
| KR | 2002-0010952 | 2/2002 |

* cited by examiner

*Primary Examiner*—Richemond Dorvil
*Assistant Examiner*—Leonard Saint Cyr
(74) *Attorney, Agent, or Firm*—Staas & Halsey LLP

(57) ABSTRACT

A method and apparatus for robust speaker localization and a camera control system employing the same are provided. The apparatus for speaker localization includes: a difference spectrum obtaining section which obtains a difference spectrum of a first pseudo-power spectrum for a speech section and a second pseudo-power spectrum for a non-speech section detected in a voice signal output from a microphone array; and a speaker direction estimation section which detects a peak value in any one of the difference spectrum and the first pseudo-power spectrum, and estimates the direction of a speaker based on the direction angle corresponding to the detected peak value.

32 Claims, 18 Drawing Sheets

CLEAN ENVIRONMENT

SNR=5dB

METHOD AND APPARATUS FOR ROBUST SPEAKER LOCALIZATION AND AUTOMATIC CAMERA STEERING SYSTEM EMPLOYING THE SAME

CROSS-REFERENCE TO RELATED APPLICATION

This application claims priority from Korean Patent Application No. 2003-70981, filed on Oct. 13, 2003, the contents of which is incorporated herein by reference.

BACKGROUND OF THE INVENTION

1. Field of the Invention

The present invention relates to speaker localization, and more particularly, to a method and apparatus for noise-robust speaker localization using spectral subtraction between the pseudo-power spectrum in a speech section of an input signal and the pseudo-power spectrum in a non-speech section of the input signal and an automatic camera steering system employing the same.

2. Description of Related Art

Recently, a mobile robot operating in indoor environments has been highlighted by the needs for health, safety, home networking, entertainment, and so on. Human robot interaction (HRI) is essential in this mobile robot. Typically such a robot has a microphone, a vision system, ultrasound sensors, infrared sensors, laser sensors, and the like, and by using these devices, should recognize human beings and surrounding situations. In particular, the location of a person talking around the robot should be identified and the person's speech should be understood so that HRI can be efficiently implemented.

In a mobile robot, a voice and sound input system is an essential element not only for HRI but also for autonomous navigation. Important issues arising in a voice input system in an indoor environment include noise, reverberation, and distance. In an indoor environment, there are reverberations caused by a variety of noise sources, walls and other objects. The low frequency component of voice has a characteristic that it is attenuated more than the high frequency component with respect to distance. In an indoor environment where there is noise, a voice input system needed for HRI should enable a mobile robot to autonomously navigate and receive the voice of a user at a distance of several meters and identify the location of the user and the voice can be used directly for speech recognition through speech enhancement and noise removal.

Generally, methods of estimating sound source direction are broken down into beamformer based methods, time delay of arrival (TDOA) based methods, and spectrum estimation based methods. Beamformer based methods have shortcomings. Firstly, in addition to the frequency component of noise, the frequency component of sound source should be known in advance. Secondly, an objective function which should be minimized does not have only one global minimum value, but can frequently have a plurality of local minimum values. Accordingly, these beamformer based methods are not appropriate for sound source direction estimation.

Meanwhile, TDOA based methods usually use two microphones, obtain the time difference between signals arriving at the two microphones from a sound source, and estimate the direction of the sound source. General cross-correlation (GCC) is a leading example. This method has a drawback that if there is a reverberation, the performance rapidly degrades and is greatly affected by the characteristic of background noise. In addition, there are restrictions that only two microphones are usually used and this method can be applied only to a free space. Accordingly, if a plurality of microphones are arranged on the circumference of the body of a robot in order to cover 360° and there are no direct paths from a sound source to respective microphones, an inaccurate time difference is obtained. Therefore, TDOA methods are not appropriate for sound source direction estimation.

Meanwhile, spectrum estimation based methods find the direction of a sound source by estimating and analyzing frequency components of a signal incident on a microphone array. The spectrum estimation based methods include an autoregressive method, a minimum variance method and a subspace method. Among them, the subspace method has the advantage that the method is relatively free from the restriction that the estimation can be applied only to a free space and therefore it is easy to apply the method to an indoor environment. Methods using subspace include multiple signal classification (MUSIC) and estimation of signal parameters via rotationally invariant techniques (ESPRIT). Among them, a MUSIC algorithm is known as the most frequently used and to have the best performance. The MUSIC algorithm is disclosed in detail in an article by R. O. Schmidt, "Multiple Emitter Location and Signal Parameter Estimation," IEEE Trans. Antenna Propag., vol. AP-34, pp. 276-280, March, 1986, and an ESPRIT algorithm is disclosed in detail in an article by R. Roy and T. Kailath, "Estimation of Signal Parameters via Rotational Invariance Techniques," IEEE Trans. Acoust., Speech Process., vol. ASSP-37, pp. 984-995, 1989.

According to the MUSIC algorithm, voice signals from M microphones forming a microphone array are input and each voice signal is divided into sections of a specified length. Then, an M×M covariance matrix of the voice signal in each divided section is obtained and by using eigenvalue decomposition, the basis vector in a noise subspace is obtained from the covariance matrix and by projecting a steering vector obtained in advance onto the basis vector of the noise subspace, and a pseudo-power spectrum is obtained. Then, since a steering vector corresponding to the direction of the steering of the sound source has a small value close to '0' when projected onto the basis vector in the noise subspace, the pseudo-power spectrum in that direction has a very big value. If peak values in the pseudo-power spectrum covering 360° are finally obtained, the direction angle corresponding to the peak value becomes the direction of each sound source.

Theoretically, the MUSIC algorithm can find the direction of each sound source when the number of sound sources is less than the number of microphones used in the microphone array. For convenience of explanation, if it is assumed that there is one voice source (speaker) and one noise source, usually a direction having the highest peak value is determined as the direction of the speaker. However, in a noisy environment, both directions of noise and voice can be estimated, but it is impossible to distinguish the direction of the speaker desired to find from the other direction. For example, if the power of noise is greater than the power of voice when a direction in which the amplitude of a pseudo-power spectrum is the largest is estimated as the voice direction, there is a problem that the direction of noise can be taken for the direction of voice.

BRIEF SUMMARY

An embodiment of the present invention provides a method and apparatus for noise-robust speaker localization by using spectral subtraction between pseudo-power spectra in a speech section and in a non-speech section.

An embodiment of the present invention also provides an automatic camera steering system employing the apparatus for speaker localization.

According to an aspect of the present invention, there is provided an apparatus for speaker localization, including: a difference spectrum obtaining section which obtains a difference spectrum of a first pseudo-power spectrum for a speech section and a second pseudo-power spectrum for a non-speech section detected in a voice signal output from a microphone array; and a speaker direction estimation section which detects a peak value in any one of the difference spectrum and the first pseudo-power spectrum, and estimates the direction of a speaker based on the direction angle corresponding to the detected peak value.

According to another aspect of the present invention, there is provided a method of speaker localization including: obtaining a difference spectrum of a first pseudo-power spectrum for a speech section and a second pseudo-power spectrum for a non-speech section detected in a voice signal output from a microphone array; and detecting a peak value in any one of the obtained difference spectrum and the first pseudo-power spectrum, and estimating the direction of a speaker based on the direction angle corresponding to the detected peak value.

According to still another aspect of the present invention, there is provided an automatic camera steering system including: a speaker direction estimation unit which detects a peak value in any one of a difference spectrum of a first pseudo-power spectrum for a speech section and a second pseudo-power spectrum for a non-speech section detected in a voice signal output from a microphone array, and the first pseudo-power spectrum, and which estimates the direction angle corresponding to the detected peak value, as the direction of a speaker; and a driving motor control unit which controls a camera driving motor according to the estimated direction of the speaker.

The aforementioned method can be implemented by a computer readable recording medium encoded with processing instructions for causing a computer program to perform the method.

Additional and/or other aspects and advantages of the present invention will be set forth in part in the description which follows and, in part, will be obvious from the description, or may be learned by practice of the invention.

BRIEF DESCRIPTION OF THE DRAWINGS

These and/or other aspects and advantages of the present invention will become apparent and more readily appreciated from the following detailed description, taken in conjunction with the accompanying drawings of which.

DETAILED DESCRIPTION OF EMBODIMENTS

Figure 1:
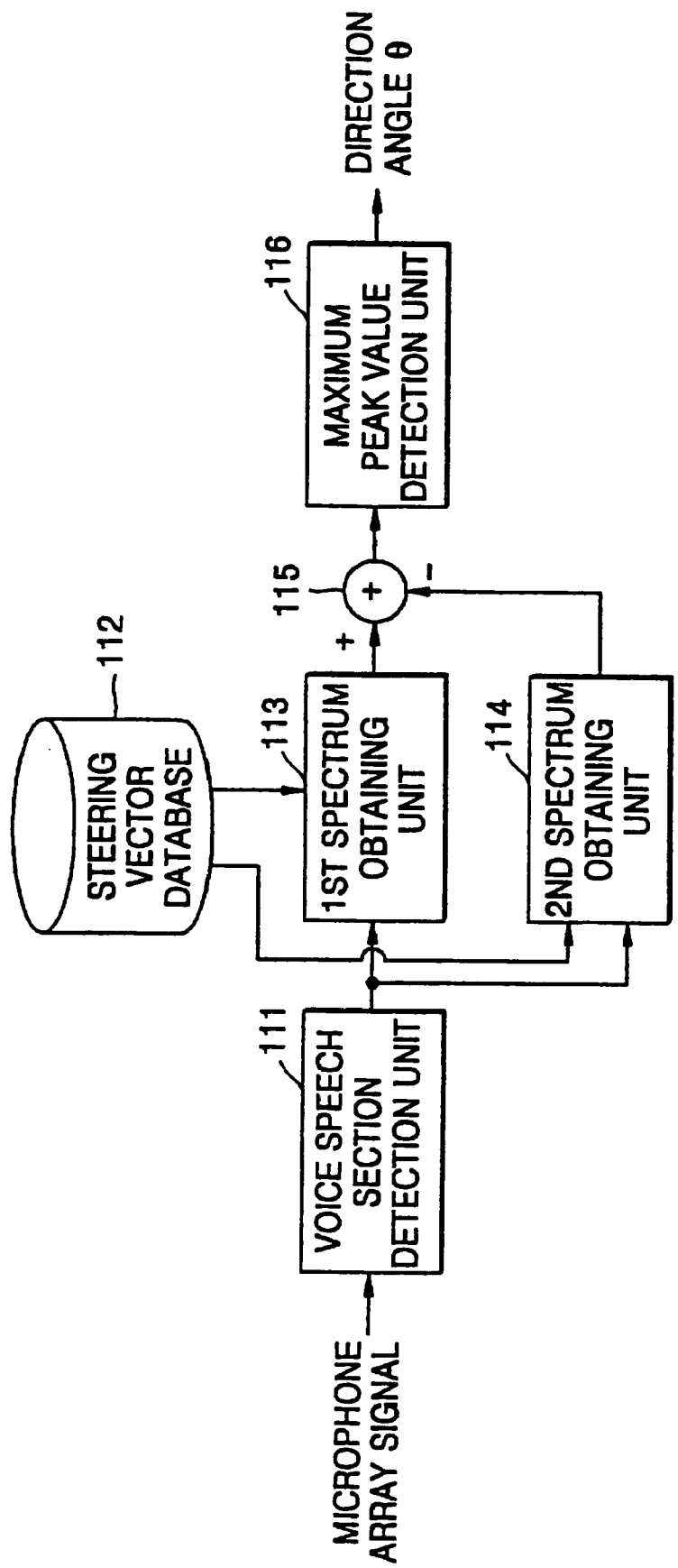
FIG. 1 is a block diagram of the structure of an apparatus for speaker localization according to an embodiment of the present invention.

Reference will now be made in detail to the embodiments of the present invention, examples of which are illustrated in the accompanying drawings, wherein like reference numerals refer to the like elements throughout. The embodiments are described below to explain the present invention by referring to the figures.

First, the MUSIC technology for estimating a sound source direction will now be briefly explained.

A signal (x(k)) received by a microphone array can be expressed in a frequency domain as the following equation 1:

$$x(k) = \sum_{l=1}^{L} a(\theta_l, k) s_l(k) + n(k) \quad (1)$$

Here, a(θl,k) and n(k) can be expressed by the following equations 2 and 3, respectively:

$$a(\theta_l, k) = [\alpha_{l,1}(k)e^{-j\omega_k \tau_{l,1}}, \alpha_{l,2}(k)e^{-j\omega_k \tau_{l,2}}, \ldots, \alpha_{l,M}(k)e^{-j\omega_k \tau_{l,M}}]^T \quad (2)$$

$$n(k) = [n_1(k), n_2(k), \ldots, n_M(k)]^T \quad (3)$$

In the equations 1 through 3, L denotes the number of sound sources incident on the microphone array, M denotes the number of microphone in the microphone array, k denotes a discrete frequency index, nm(k) denotes omnidirectional noise or measurement noise received by an m-th microphone, θl denotes the incident direction of an l-th sound source, $\alpha_{l,m}(k)e^{-j\omega_k \tau_{l,m}}$ denotes the transfer function between the l-th sound source and the m-th microphone, and $\alpha_{l,m}$ and $\tau_{l,m}$ denote the attenuation and delay time, respectively, when the l-th sound source arrives at the m-th microphone. If the incident direction θl of the l-th sound source is determined, $\tau_{l,m}$ (m=1, . . . , M) is determined. Accordingly, estimation of time delay ($\tau_{l,m}$ (m=1, . . . , M)) becomes identical to estimation of the incident direction θl of the l-th sound source.

Next, in order to use the subspace method, a spatial covariance matrix R(k) of x(k) is obtained and R(k) is defined as the following equation 4:

$$R(k) \equiv E[x(k)x^H(k)] \quad (4)$$

However, R(k) cannot be obtained accurately and only its estimate $\hat{R}(k)$ can be obtained by the following equation 5:

$$\hat{R}(k) \equiv \frac{1}{G}\sum_{g=a}^{G+a} x_g(k)x_g^H(k) \quad (5)$$

Here, g denotes g-th frame and G denotes the number of total frames used to obtain an average. A subspace of a signal and that of noise can be obtained by eigenvalue decomposition of $\hat{R}(k)$ as the following equations 6 through 8:

$$\hat{R}(k) = EVE^H \quad (6)$$

$$V = \text{Diag}[\lambda_1, \lambda_2, \ldots, \lambda_M], \lambda_1 \geq \lambda_2 \geq \ldots \geq \lambda_M \quad (7)$$

$$E = [e_1, e_2, \ldots e_M] \quad (8)$$

First L(<M) eigenvalues of $\hat{R}(k)$ are values much greater than the remaining values, and compared to these, the remaining (M-L) eigenvalues are quite small and similar values. Eigenvectors {eM-L, eM-L+1, . . . , eM} of these small (M-L) eigenvalues become a basis vector of noise subspace. Here, if it is defined that ENoise≡[eM-L, eM-L+1, . . . , eM], a pseudo-power spectrum of the MUSIC algorithm is defined as the following equations 9 and 10:

$$P(\theta, k) = \frac{a^H(\theta, k)a(\theta, k)}{a^H(\theta, k)E_{Noise}E_{Noise}^H a(\theta, k)} \quad (9)$$

$$P(\theta) = \frac{1}{N_K}\sum_{k \in K}^{N_K} P(\theta, k) \quad (10)$$

Here, K denotes a set of discrete frequencies k used for the calculation of the pseudo-power spectrum P(θ,k), NK denotes the number of discrete frequencies k in K, P(θ,k) denotes the pseudo-power spectrum corresponding to k-th discrete frequency, and P(θ) denotes an average value of P(θ,k) for all frequencies k in K. Meanwhile, each sound source direction θl (l=1, . . . , L) is a respective θ value corresponding to the L peak values in P(θ).

Meanwhile, in steering vector a(θl,k) expressed by the equation 2, $\alpha_{l,m}(k)$ is 1/rl,m for a short distance sound source in a free space, and is 1 for a long distance sound source. Here, rl,m denotes the distance between l-th sound source and m-th microphone. However, since a microphone is coupled to the body of a mobile robot which is not exposed to a free space, it is theoretically difficult to find $\alpha_{l,m}(k)$. Accordingly, in the present embodiment, by using a transfer function between an actual sound source and a microphone array, a(θl,k) is obtained.

FIG. 1 is a block diagram of the structure of an apparatus for speaker localization according to an embodiment of the present invention, including a speech section detection unit 111, a steering vector database 112, a first spectrum obtaining unit 113, a second spectrum obtaining unit 114, a subtraction unit 115, and a maximum peak value detection unit 116.

Referring to FIG. 1, the speech section detection unit 111 receives inputs of voice signals output from a microphone array in units of frames, detects a speech section of the input signals, and by using the detected speech section, detects a non-speech section of the input signals. Here, the speech section is a section where there are both voice and noise, and the non-speech section is regarded as a section where there is only noise. If a speech section is detected, T1 samples preceding the speech section are jumped over and T2 samples preceding the T1 samples are set as a non-speech section. For example, in a 16 HKz sampling rate, the rate can be set at T1=2000 and T2=5000. In order to detect a speech section, single frame voice activity detection_probability (SFVAD_P) indicating that there is voice in a signal frame is used, and by checking SFVAD_P through multiple frames, an actual speech section is detected. Since the SFVAD algorithm is based on an SNR and consequently signals having a high SNR in addition to voices are given all high SFVAD_P values, it is difficult to detect a speech section only with a SFVAD_P value on a single frame, and furthermore, it is highly probable that erroneous detection occurs. Accordingly, SFVAD_P values are checked in multiple frames. The detailed operation of this speech section detection unit 111 will be explained later referring to FIG. 3. Meanwhile, the SFVAD algorithm is disclosed in detail in an article by Nam-Soo Kim and Joon-Hyuk Chang, "Spectral Enhancement Based on Global Soft Decision," IEEE Signal Processing Letters, vol. 7, No. 5, pp. 108-110, 2000 and an article by Vladimir I, Shin and Doh-Suk Kim, "Speech Enhancement Using Improved Global Soft Decision," in Proc. Europ. Conf. on Speech Communication and Technology, 2001.

The steering vector database 112 stores steering vectors obtained by using the transfer function between an actual sound source and the microphone array. The transfer function is measured, for example, in each 5 degree angle interval from a location at a distance of 1.5 m from the robot. The measurement interval 5 degrees determines the resolution of the MUSIC algorithm.

The first spectrum obtaining unit 113 obtains a first pseudo-power spectrum for the speech section detected in the speech section detection unit 111, according to the MUSIC algorithm described above, by using the steering vector of the steering vector database 112. The second spectrum obtaining unit 114 obtains a second pseudo-power spectrum for the non-speech section detected in the speech section detection unit 111, according to the MUSIC algorithm described above, by using the steering vector of the steering vector database 112.

The subtraction unit 115 subtracts the second pseudo-power spectrum obtained in the second spectrum obtaining unit 114, from the first pseudo-power spectrum obtained in the first spectrum obtaining unit 113 and generates the difference spectrum.

The maximum peak value detection unit 116 detects a maximum peak value in the difference spectrum of the first and second pseudo-power spectra provided by the subtraction unit 115, and outputs the direction angle (θ) generating the maximum peak value, as the direction of the speaker.

That is, since peak values in the first pseudo-power spectrum obtained in the speech section occur in the direction of noise and in the direction of voice, and a peak value in the second pseudo-power spectrum obtained in the non-speech section occurs in the direction of noise, a peak value in the difference spectrum of the first and second pseudo-power spectra occurs only in the direction of voice. Thus, the direction angle generating the peak value is estimated as the direction of the location of the speaker.

Figure 2:
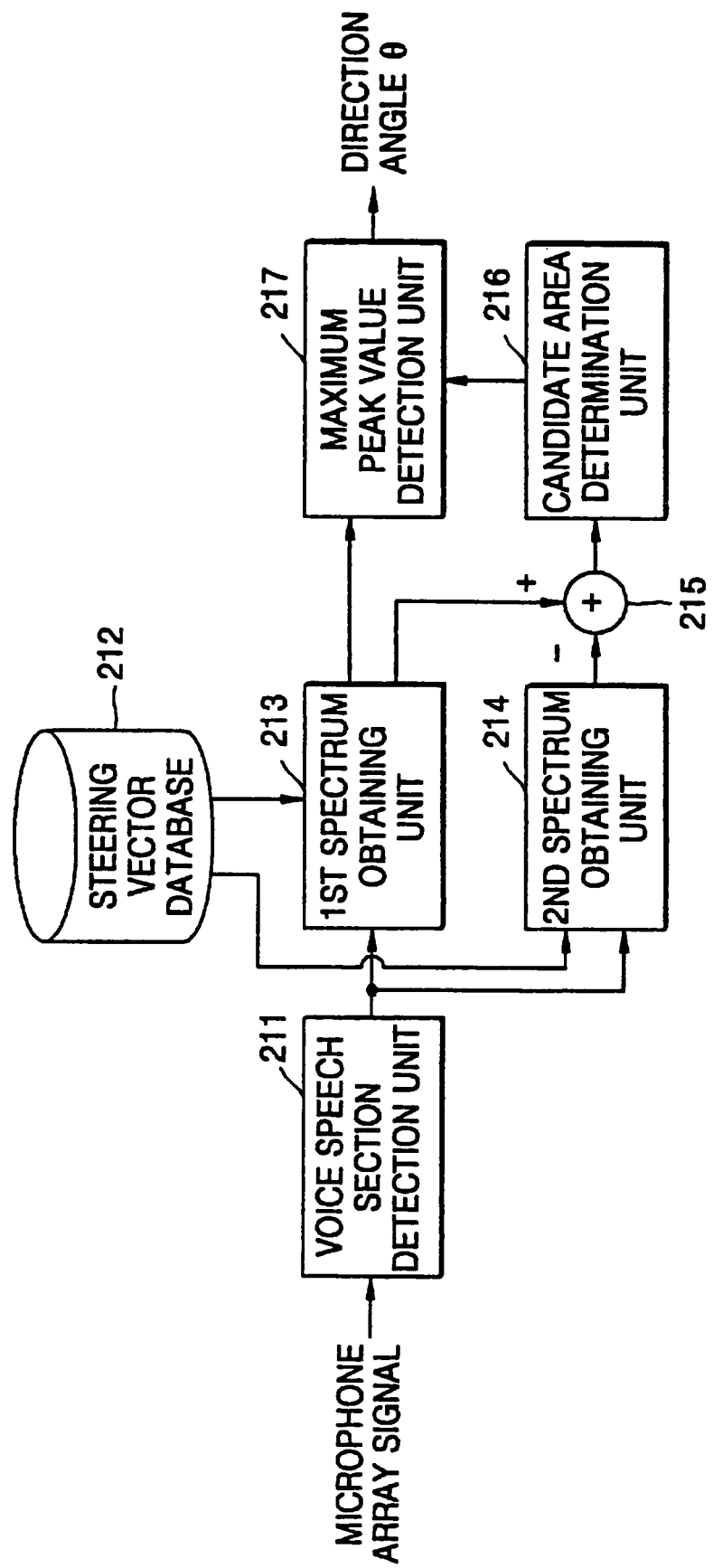
FIG. 2 is a block diagram of the structure of another apparatus for speaker localization according to an embodiment of the present invention.

FIG. 2 is a block diagram of the structure of another apparatus for speaker localization according to an embodiment of the present invention, comprising a speech section detection unit 211, a steering vector database 212, a first spectrum obtaining unit 213, a second spectrum obtaining unit 214, a subtraction unit 215, a candidate area determination unit 216, and a maximum peak value detection unit 217. Here, since the operations of the speech section detection unit 211, the steering vector database 212, the first spectrum obtaining unit 213, the second spectrum obtaining unit 214, and the subtraction unit 215 are the same as in the embodiment shown in FIG. 1, the detailed explanation will be omitted and only those components which differ will be explained.

Referring to FIG. 2, the candidate area determination unit 216 finds a maximum peak value in the difference spectrum of the first and second pseudo-power spectra provided by the subtraction unit 215, determines a specified section including the direction angle corresponding to the found maximum peak value, as a candidate area in which a peak value in a pseudo-power spectrum obtained in the speech section is searched for, and provides the candidate area to the maximum peak value detection unit 217. The candidate area includes the direction angle ±10 degrees, the direction angle corresponding to the maximum peak value found from the difference spectrum.

The maximum peak value detection unit 217 detects the maximum peak value in the candidate area provided by the candidate area detection unit 126, in the first pseudo-power spectrum for the speech section provided by the first spectrum obtaining unit 213, and outputs the direction angle (θ) generating the maximum peak value as the direction of the speaker.

Figure 3:
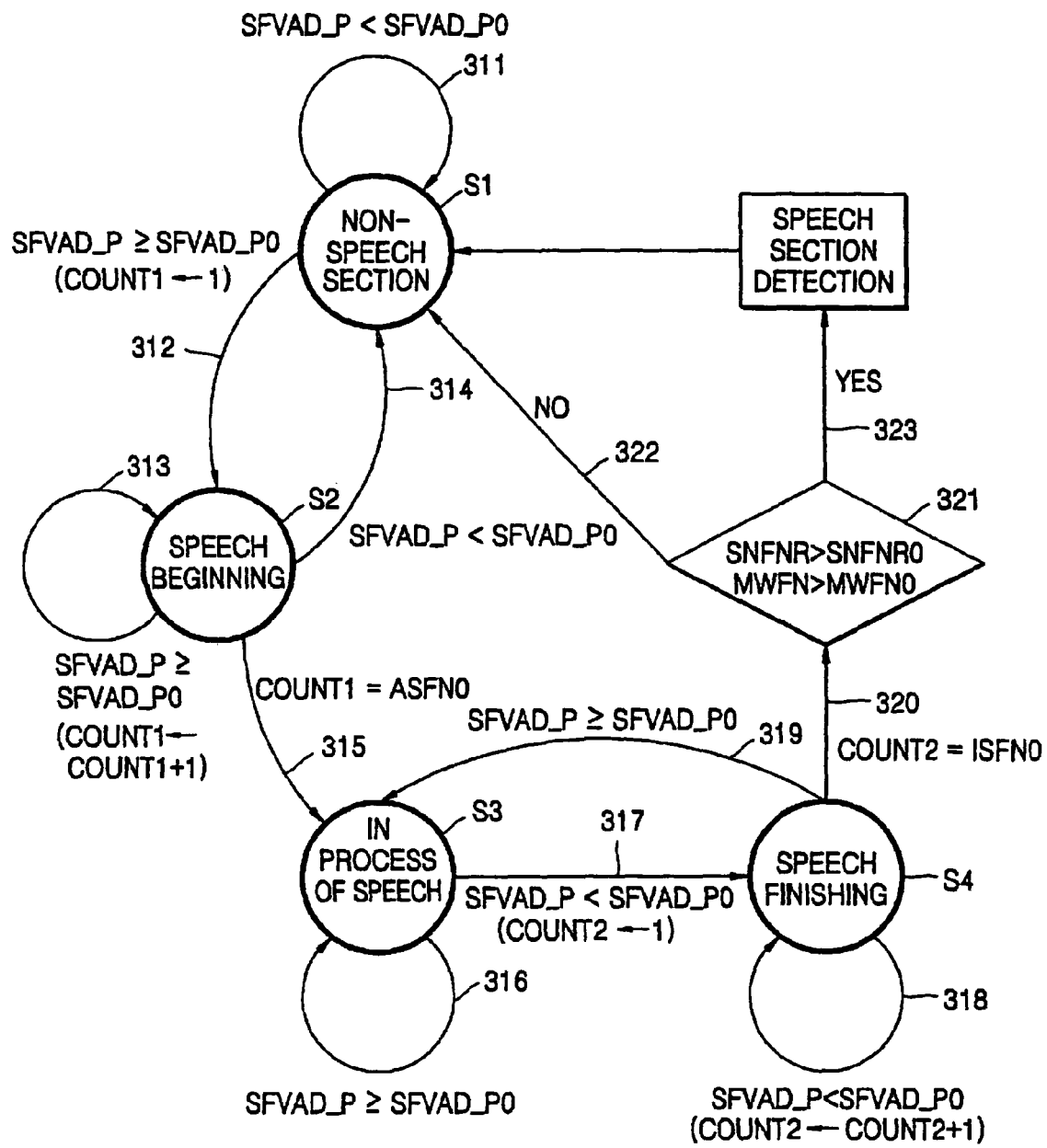
FIG. 3 is a state diagram showing the operation of a speech section detection units of FIGS. 1 and 2.

FIG. 3 is a state diagram showing the operation of the respective speech section detection units 111 and 211 of FIGS. 1 and 2, and first through fifth parameters used in detecting a speech section are shown in the following table 1:

TABLE 1

| Parameter | Explanation |
| --- | --- |
| 1st parameter (SFVAD_P) | Probability value obtained from SFVAD |
| 2nd parameter (ASFN) | Number of successive frames determined as speech |
| 3rd parameter (ISFN) | Number of successive frames determined as non-speech |
| 4th parameter (SNFNR) | Ratio of the Number of frames determined as speech to the number of frames determined as non-speech in determined speech section and |
| 5th parameter (MWFN) | Number of total frames in determined speech section |

The first through fifth parameters (SFVAD_P, ASFN, ISFN, SNFNR, MWFN) have respective threshold values (SFVAD_P0, ASFN0, ISFN0, SNFNR0, MWFN0), and in order to accurately estimate a speech section (or, a word section), these threshold values are adaptively adjusted according to SNR.

Figure 4A:
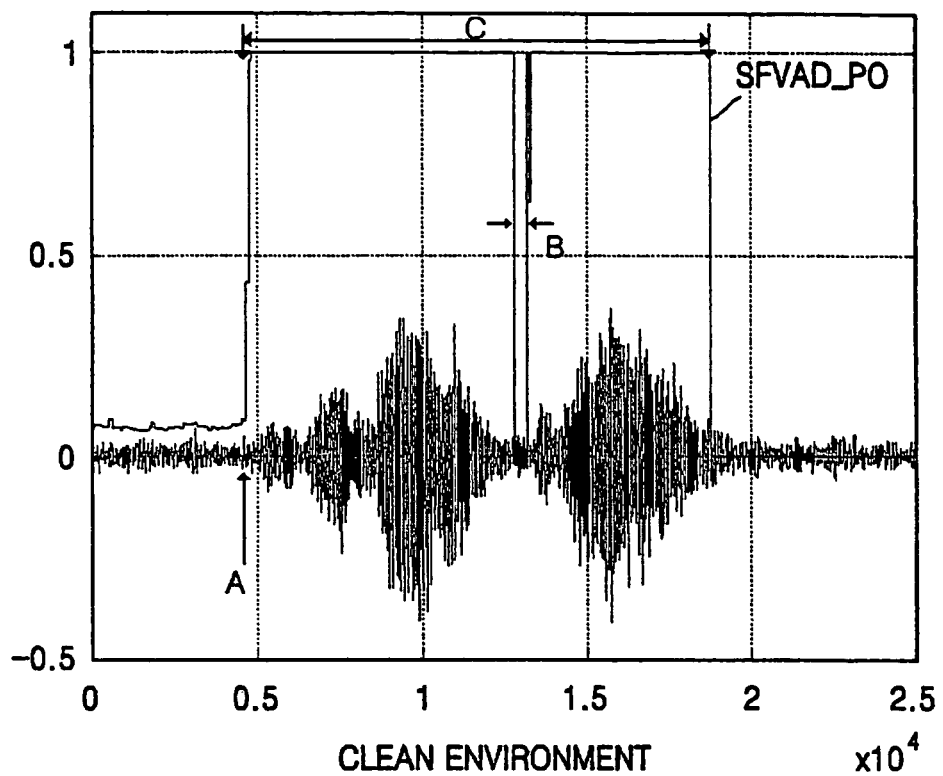
FIGS. 4A and 4B are graphs comparing characteristics of speech section detection with respect to signal-to-noise ratio (SNR) in a clean environment and in a noisy environment.
Figure 4B:
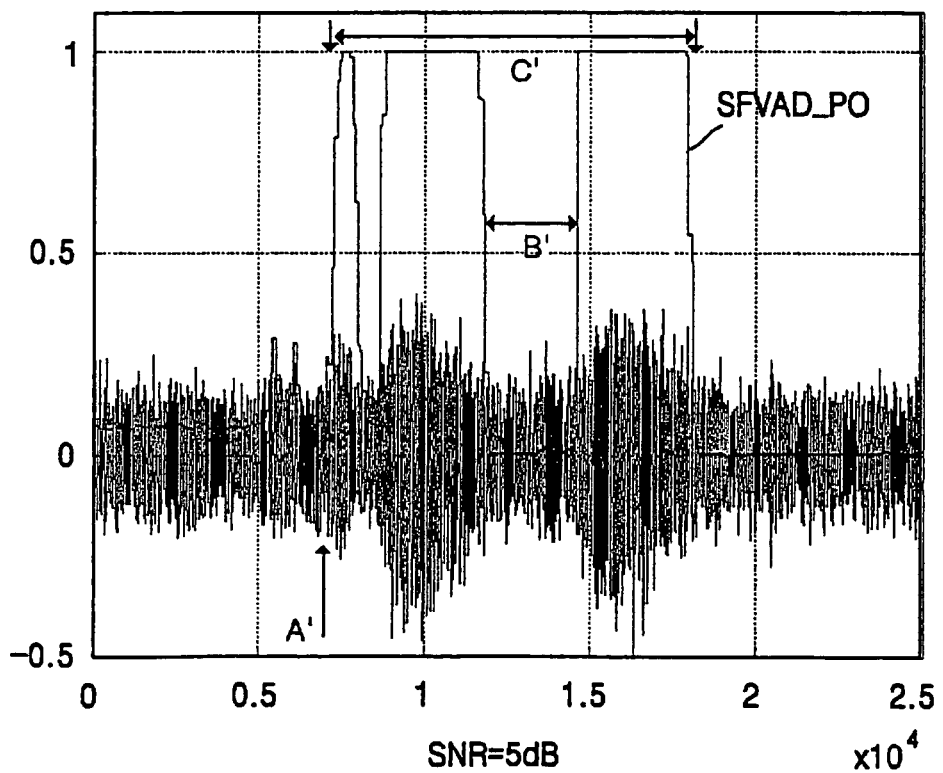
Figure 5A:
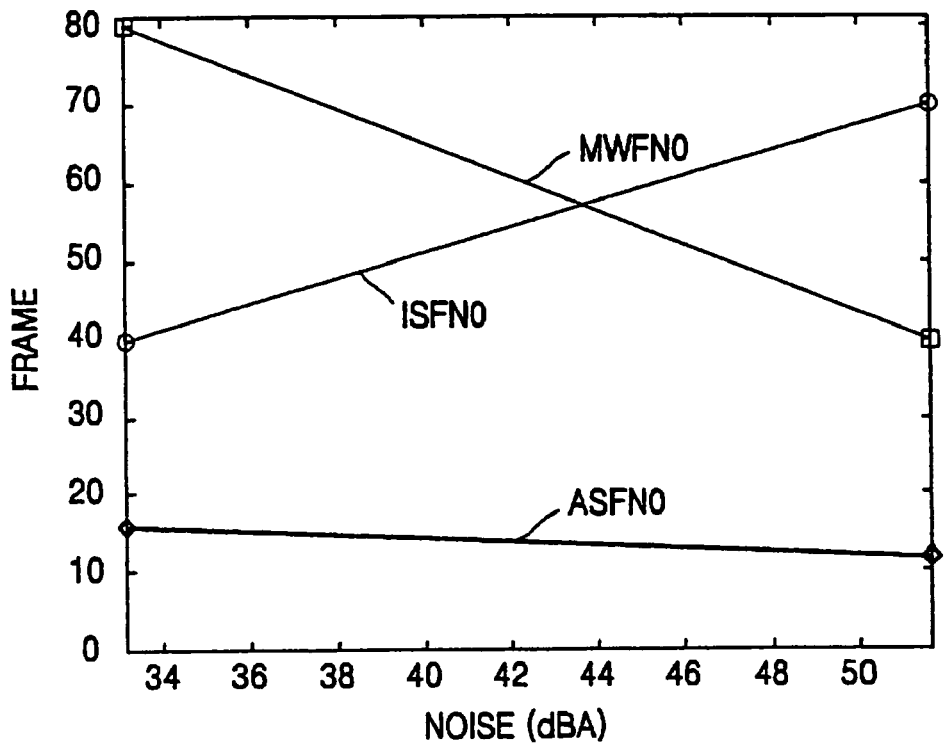
FIGS. 5A and 5B are graphs explaining linear interpolation of thresholds for first through fifth parameters used to detect speech sections.
Figure 5B:
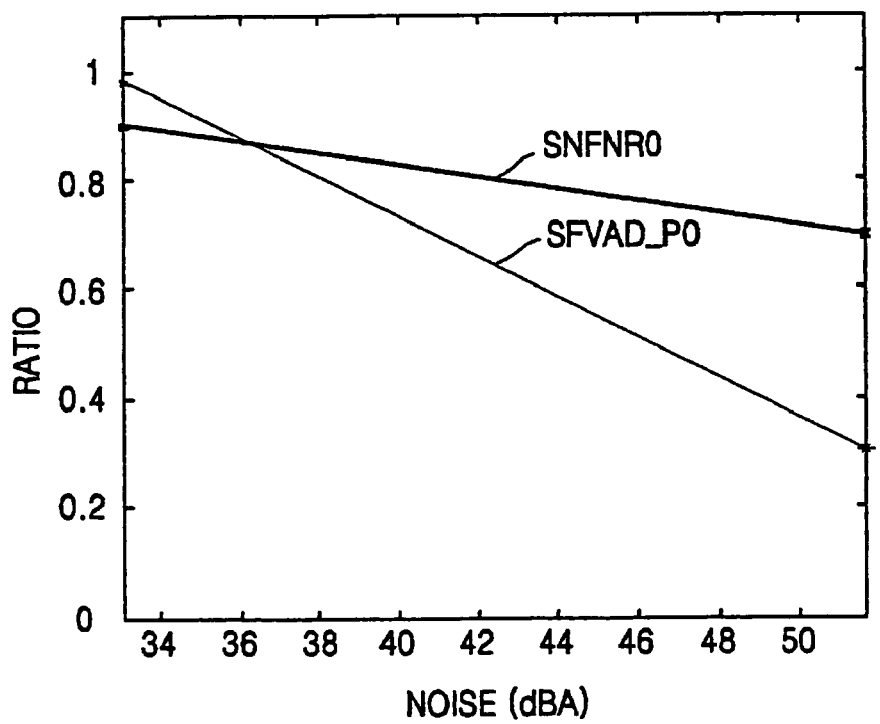

For example, if a spoken word is 'Sebastian,' and if point A and point A' in FIGS. 4A and 4B are compared, when the SNR is low, the threshold value (SFVAD_P0) of the first parameter should be set to a small value so that a start point of speech (or word) can be correctly estimated. Meanwhile, section B and section B' in FIGS. 4A and 4B, which are speech pause sections where speech is temporarily stopped in a speech section (or word section), relate to the threshold value (ISFN0) of the third parameter (ISFN). Though the threshold value (ISFN0) is small, it does not matter in a clean environment, but the threshold value (ISFN0) may be set to a large value in the low SNR environment. Meanwhile, section C and section C' in FIGS. 4A and 4B are to provide the total length of an estimated word, and the length is estimated shorter in the low SNR environment than in the clean environment. Accordingly, it is preferable that the threshold value (MWFN0) of the fifth parameter in the low SNR environment is set to a smaller value than that in the clean environment.

That is, threshold values are tuned in the clean environment and in the environment where the SNR is 5 dB (noise 51 dBA) in advance, and with the threshold values, linear interpolation for threshold values (ASFN0, ISFN0, MWFN0) related to the number of frames, and threshold values (SFVAD_P0, SNFRNR0) related to the ratio are performed. Thus, by using the threshold values linearly interpolated with respect to corresponding SNR values, the shortcoming that the rate of word detection is lowered with respect to the size of noise can be improved.

Again referring to FIG. 3, in a non-speech section state (S1), when a voice signal is input in units of frames, the first parameter (SFVAD_P) and the threshold value (SFVAD_P0) for the current frame are compared, and if the first parameter (SFVAD_P) is less than the threshold value (SFVAD_P0), while the non-speech section state (S1) is maintained, input of the voice signal of the next frame is waited for in operation 311. Meanwhile, if the first parameter (SFVAD_P) is equal to or greater than the threshold value (SFVAD_P0), the first count number (Count1) is set to 1 and the state is transited to a speech beginning state (S2) in operation 312.

In the speech beginning state (S2), the first parameter (SFVAD_P) and the threshold value (SFVAD_P0) for the next frames are again compared, if the first parameter (SFVAD_P) is equal to or greater than the threshold value (SFVAD_P0), the first count number (Count1) is incremented by 1 each time while the speech beginning state (S2) is maintained in operation 313. If the first parameter (SFVAD_P) is less than the threshold value (SFVAD_P0), the non-speech section state (S1) is returned in operation 314. Then, the first count number (Count1) is compared with the threshold value (ASFN0) of the second parameter (ASFN), and if the first count number (Count1) is the same as the threshold value (ASFN0) of the second parameter (ASFN), the state is transited to an in-process-of-speech state (S3) in operation 315.

In the in-process-of-speech state (S3), the first parameter (SFVAD_P) and the threshold (SFVAD_P0) are compared again in frames which succeed the frame in which it is determined that the first count number (Count1) is the same as the threshold value (ASFN0) of the second parameter (ASFN). If the first parameter (SFVAD_P) is equal to or greater than the threshold value (SFVAD_P0), the in-the-process-of-speech state (S3) is maintained and if the first parameter (SFVAD_P) is less than the threshold value (SFVAD_P0), a second count number (Count2) is set to 1, and the state is transited to a speech finishing state (S4) in operation 317.

In the speech finishing state (S4), the first parameter (SFVAD_P) and the threshold (SFVAD_P0) are compared again in next frames, and if the first parameter (SFVAD_P) is less than the threshold value (SFVAD_P0), the second count number (Count2) is incremented by 1 each time while the speech finishing state (S4) is maintained in operation 318. If the first parameter (SFVAD_P) is equal to or greater than the threshold value (SFVAD_P0), the in-the-process-of-speech state (S3) is returned in operation 319. Then, the second count number (Count2) is compared with the threshold value (ISFN0) of the third parameter (ISFN). If the second count number (Count2) is equal to the threshold value (ISFN0) of the third parameter (ISFN) in operation 320, the fourth parameter (SNFNR) and the fifth parameter (MWFN) for frames included in from the speech beginning state to the speech finishing state are calculated and compared with respective threshold values (SNFNR0, MWFN0) in operation 321. If any one of two conditions that the fourth parameter (SNFNR) is less than or equal to the threshold value (SNFNR0) and the fifth parameter (MWFN) is less than or equal to the threshold value (MWFN0) is not satisfied, the non-speech section state (S1) is returned in operation 322. Meanwhile, if the fourth parameter (SNFNR) is greater than the threshold (SNFNR0) and the fifth parameter (MWFN) is greater than the threshold (MWFN0), it is determined that a speech section is detected in operation 323.

Figure 6:
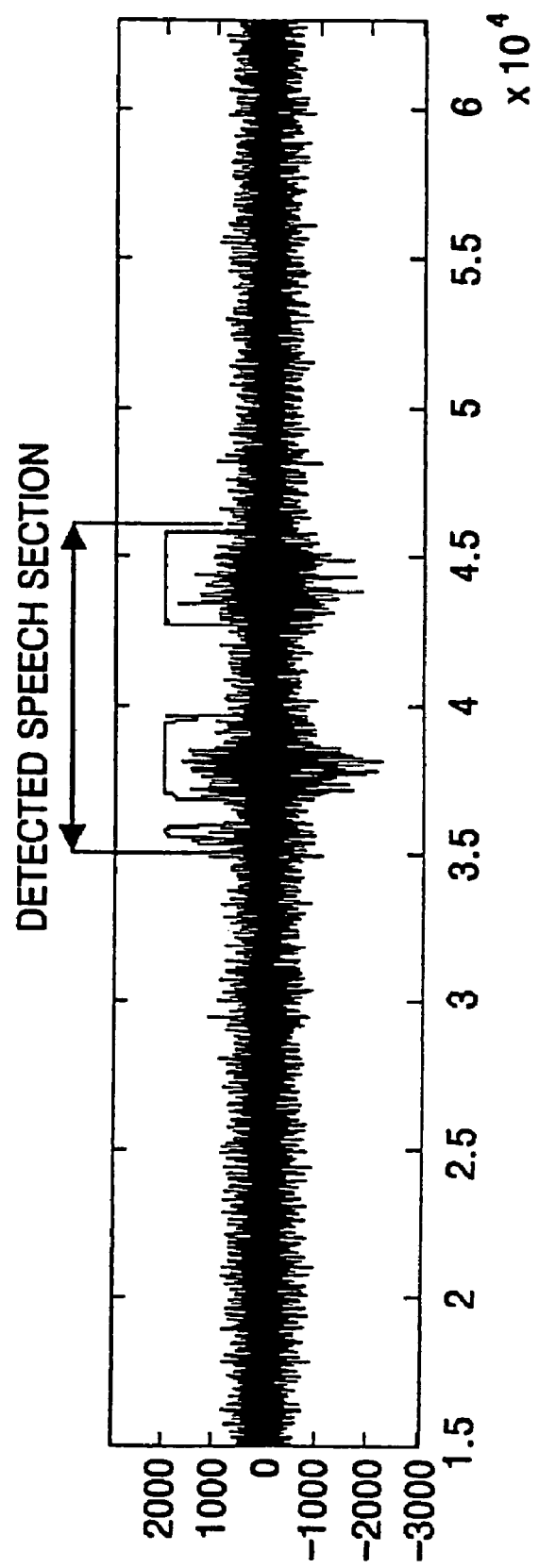
FIG. 6 is a graph showing the result of speech section detection according to an embodiment of the present invention.

FIG. 6 is a graph showing an example of detection of a speech section according to an embodiment of the present invention. The speaker is at a location at an angle of 225 degrees with respect to the robot and the distance between the speaker and the robot is 1 m. Meanwhile, the noise source is at a location at an angle of 90 degrees with respect to the robot, the distance between the noises source and the robot is 3.5 m, and the SNR is 1.33 dB. Referring to FIG. 6, it can be seen that even when the power of noise is quite high, the speech section is correctly detected.

Figure 7A:
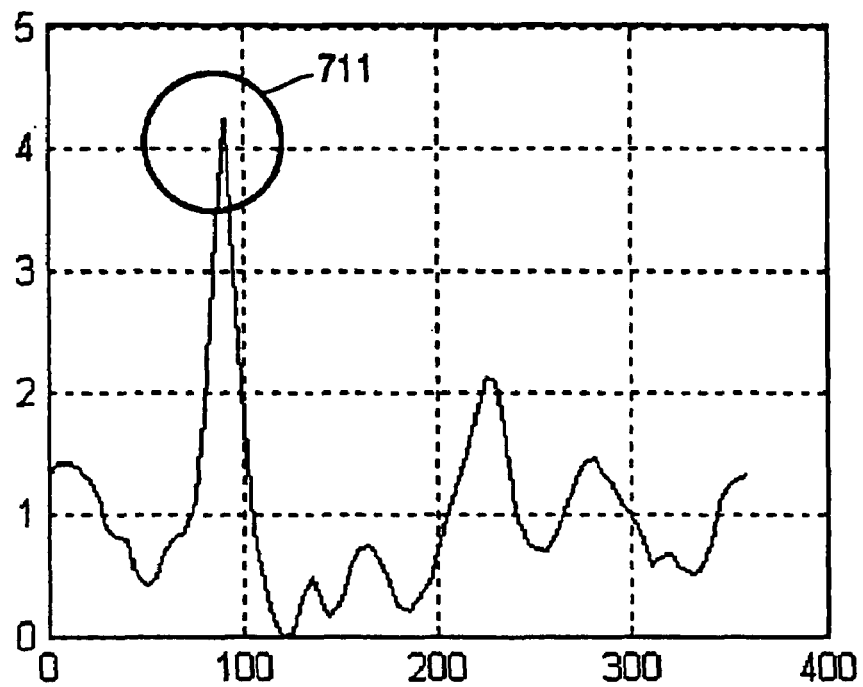
FIGS. 7A through 7C are graphs to compare the result of speaker direction detection by an ordinary MUSIC algorithm with the result of speaker direction detection according to the embodiment of the present invention shown in FIG. 1.
Figure 7B:
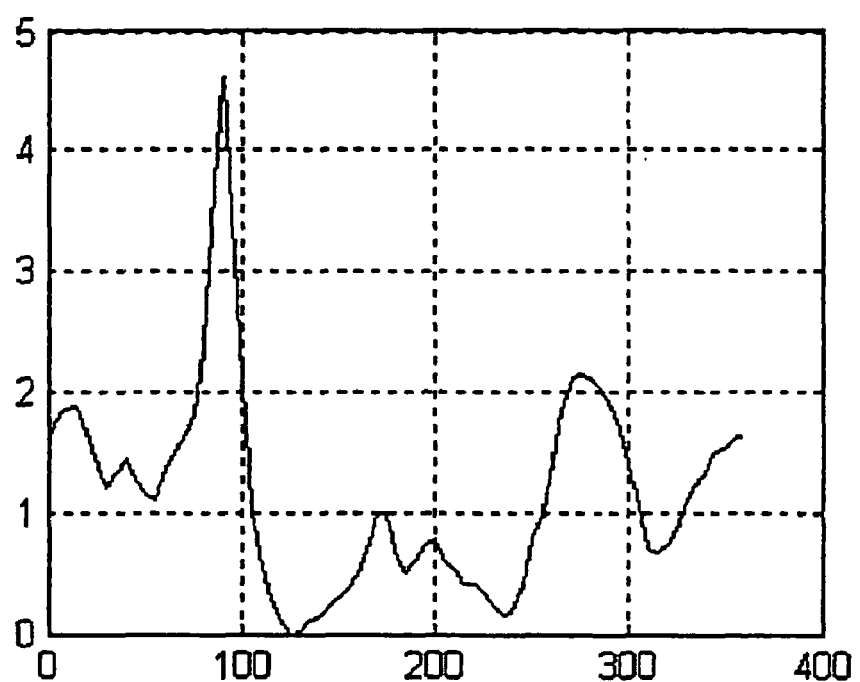
Figure 7C:
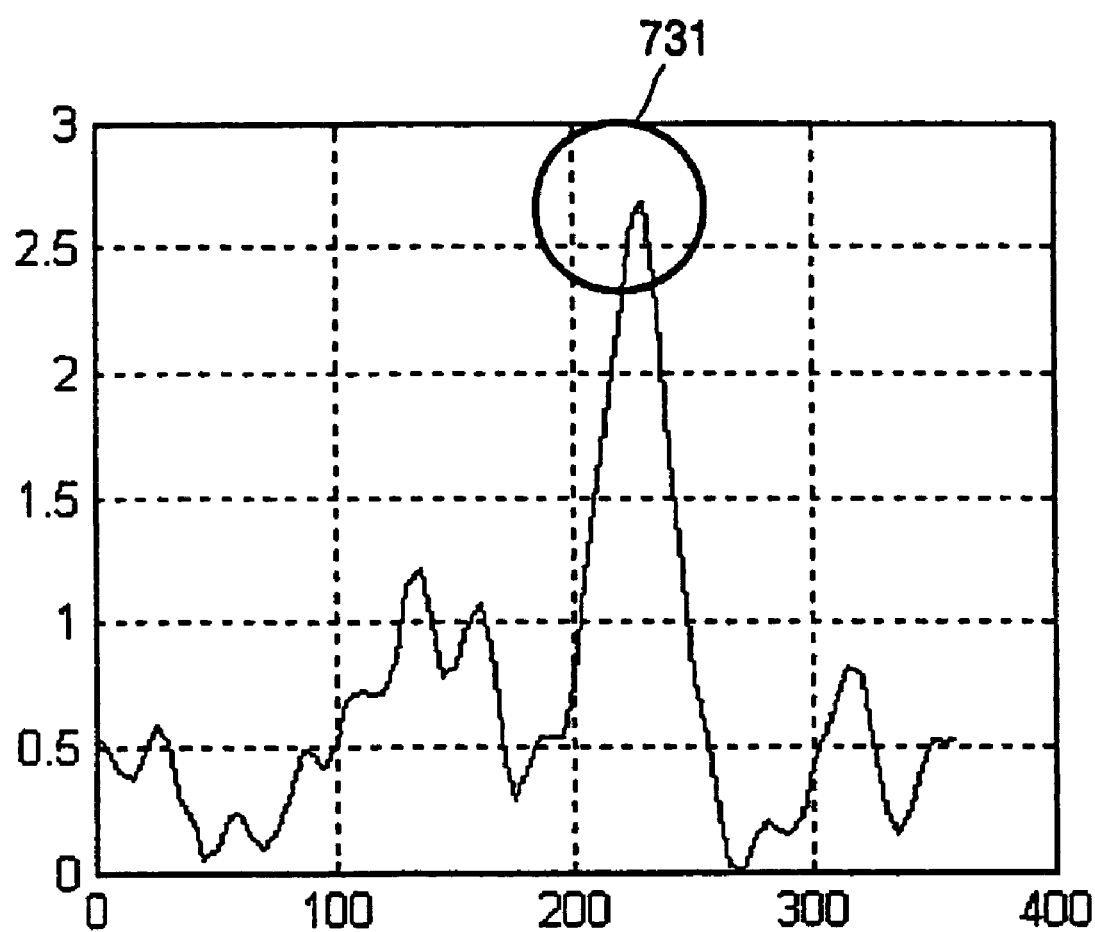

FIGS. 7A through 7C are graphs to compare the result of speaker direction detection by the ordinary MUSIC algorithm with the result of speaker direction detection according to the embodiment of the present invention shown in FIG. 1. FIG. 7A shows the first pseudo-power spectrum obtained in a speech section, FIG. 7B shows the second pseudo-power spectrum obtained in a non-speech section, and FIG. 7C shows the difference spectrum of the first and second pseudo-power spectra. That is, in the environment where the noise source is in the direction at an angle of 90 degrees, the distance between the noise source and the robot is 3.5 m, the speaker is in the direction at an angle of 225 degrees, the distance between the speaker and the robot is 1 m, and the SNR is measured as 1.33 dB, the ordinary MUSIC algorithm uses only the first pseudo-power spectrum of the speech section. Accordingly, the result of speaker direction detection indicates that the peak value 711 is in the direction angle of 90 degrees as shown in FIG. 7A, and the 90 degree direction in which the noise is located is misunderstood as the direction of the speaker. However, the result of speaker direction detection according to the present embodiment, which uses the difference spectrum between the first pseudo-power spectrum in the speech section and the second pseudo-power spectrum in the non-speech section, indicates that the peak value 731 is in the direction angle of 230 degrees as shown in FIG. 7C and the direction close to 225 degrees where the actual speaker is located is detected as the direction of the speaker. That is, the speech section and the non-speech section are detected, a peak value in the difference spectrum of the pseudo-power spectra of the respective sections is detected, and the direction angle corresponding to the peak value is determined as the direction of the speaker. By doing so, the direction of the speaker can be correctly estimated even in an environment where the noise level is high.

Figure 8:
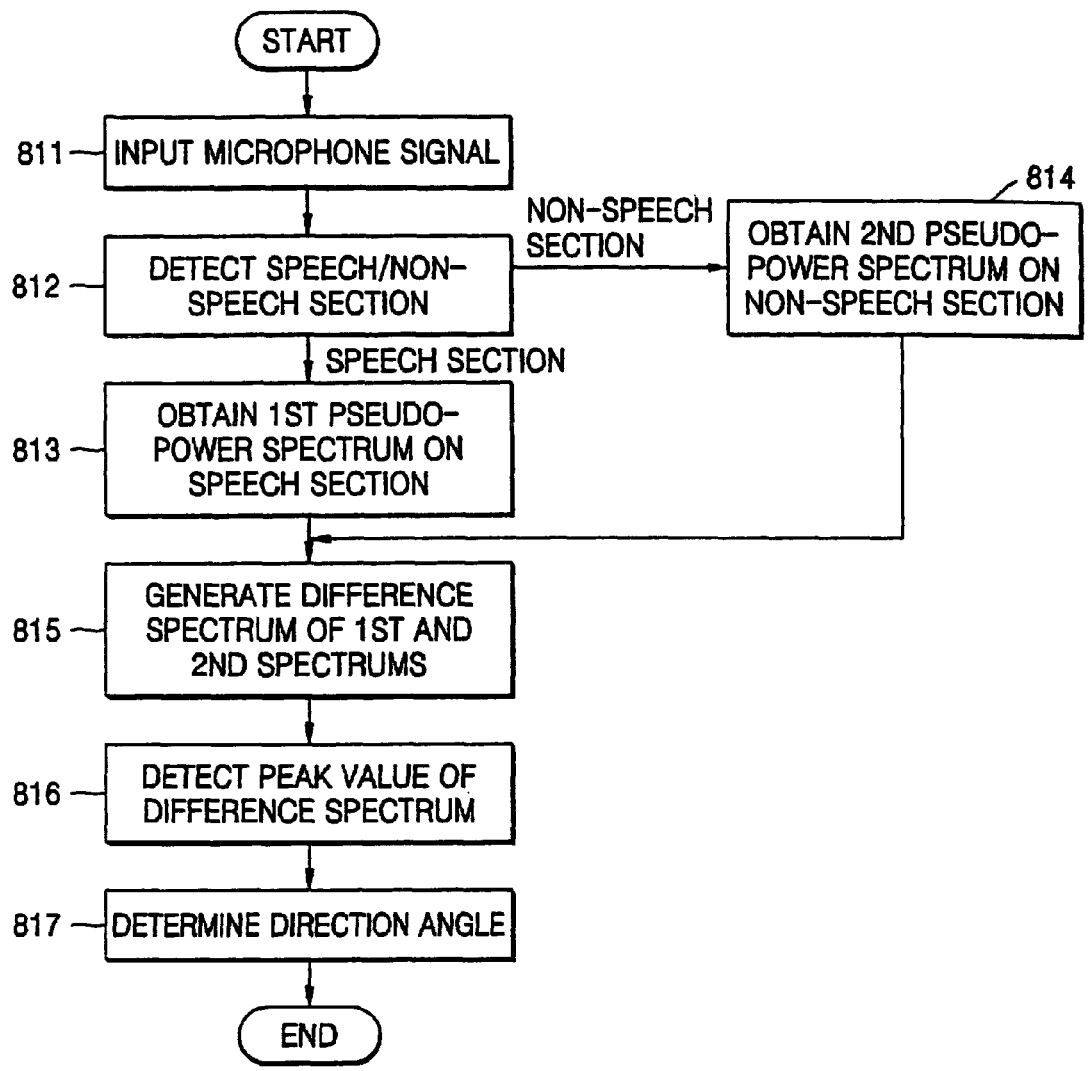
FIG. 8 is a flowchart of the operations performed in a method of speaker localization according to an embodiment of the present invention.

FIG. 8 is a flowchart of the operations performed in a method of speaker localization according to an embodiment of the present invention.

Referring to FIG. 8, a voice signal output from a microphone array (not shown) is input in units of frames in operation 811. A speech section in the voice signal input in the operation 811 is detected and by using the detected speech section, a non-speech section is detected in operation 812.

A first pseudo-power spectrum for the speech section is obtained by using equations 9 and 10 in operation 813. A second pseudo-power spectrum for the non-speech section is obtained by using equations 9 and 10 in operation 814. The difference spectrum of the first and second pseudo-power spectrum is obtained in operation 815.

A maximum peak value in the difference spectrum of the first and second pseudo-power spectra obtained in operation 815 is detected in operation 816, and the direction angle corresponding to the maximum peak value detected in the operation 816 is determined as the direction of the speaker in operation 817.

Figure 9A:
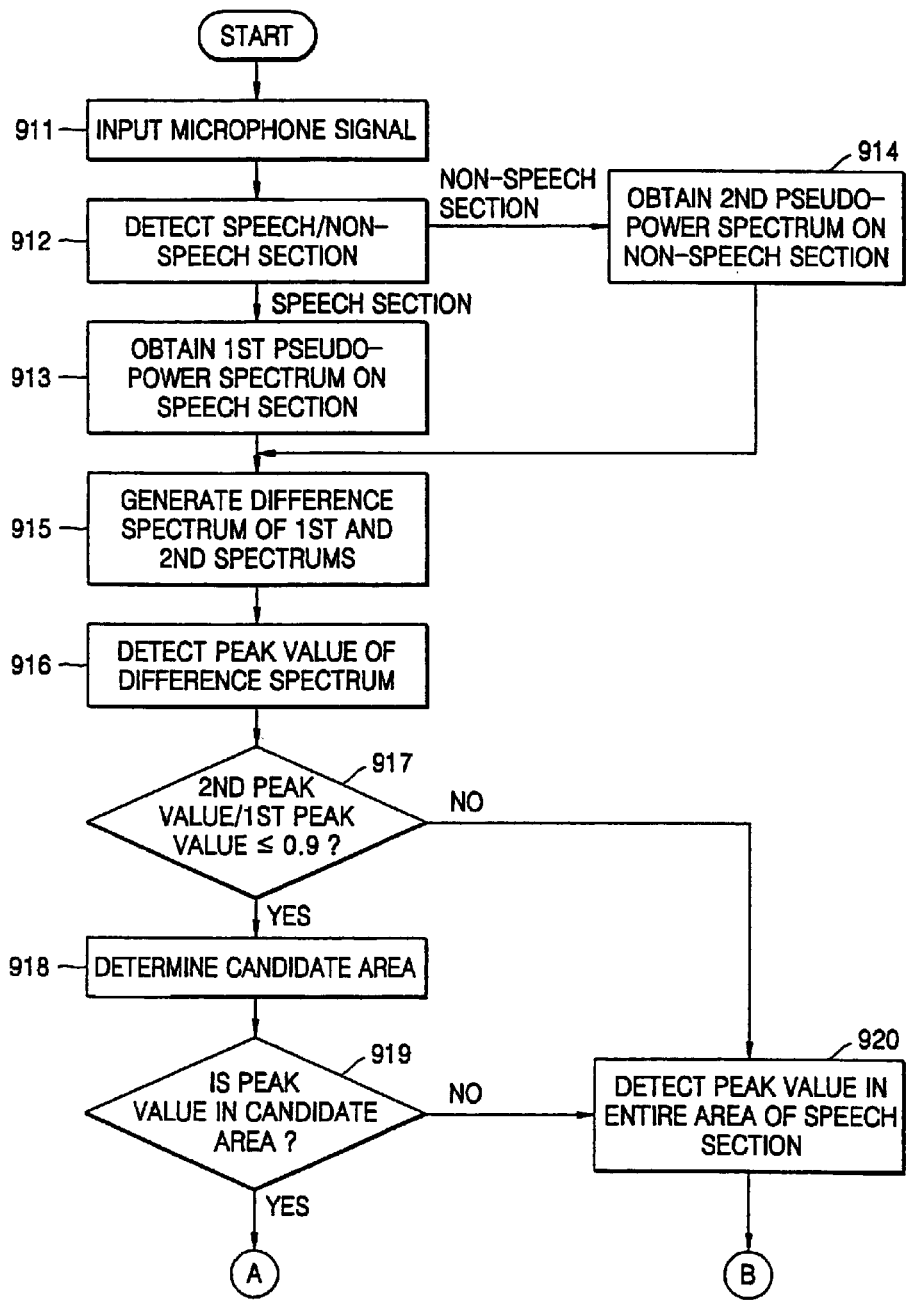
FIGS. 9A and 9B are flowcharts of the operations performed by another method of speaker localization according to an embodiment of the present invention.
Figure 9B:
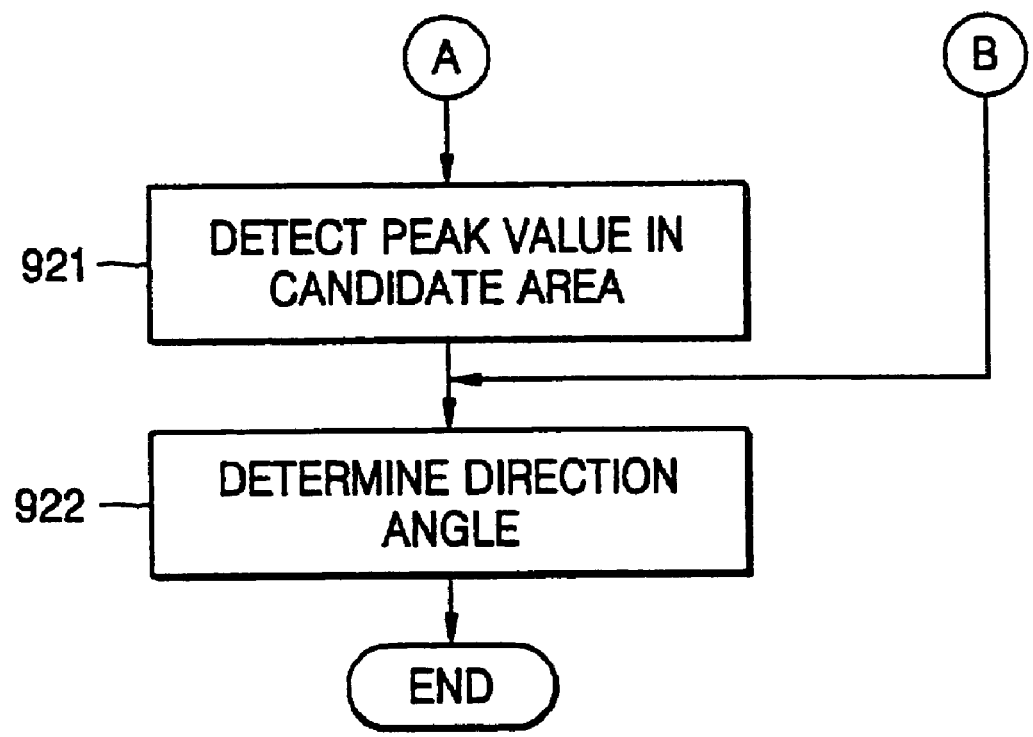

FIGS. 9A and 9B are flowcharts of the operations performed by another method of speaker localization according to an embodiment of the present invention. Here, operations 911 through 915 correspond to, and are the same as the operations 811 through 815 shown in FIG. 8, and a detailed explanation will be omitted and the different part will now be explained mainly.

Referring to FIG. 9, a first peak value having the largest value and a second peak value having the second largest value in the difference spectrum of the first and second pseudo-power spectra obtained in the operation 915 are detected in operation 916.

Figure 10A:
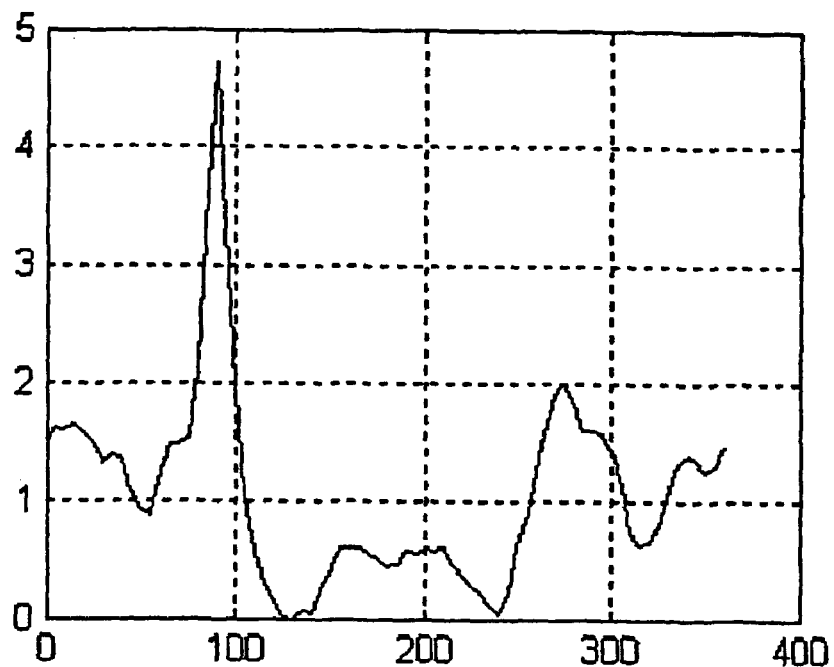
FIGS. 10A through 10C are graphs explaining the meaning of operation 917 in FIG. 9.
Figure 10B:
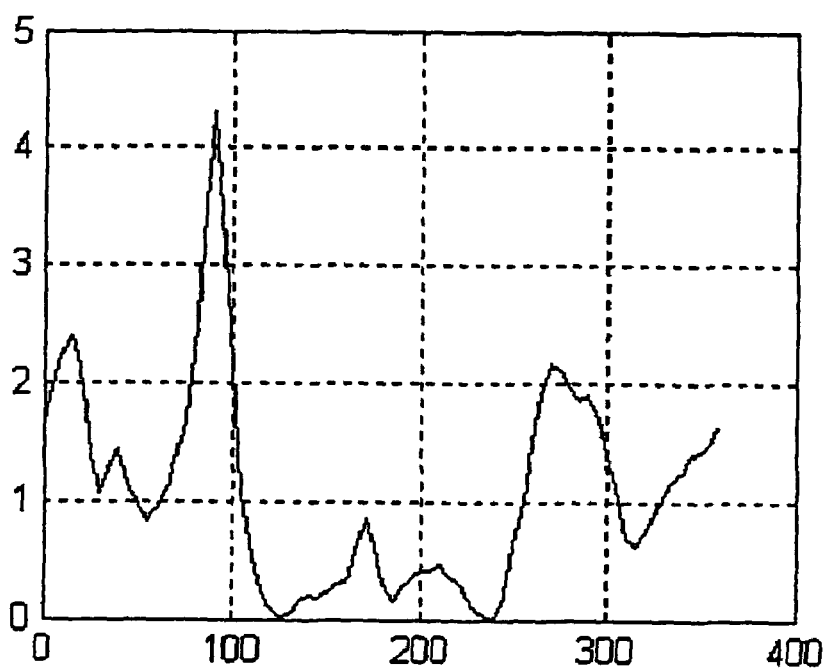
Figure 10C:
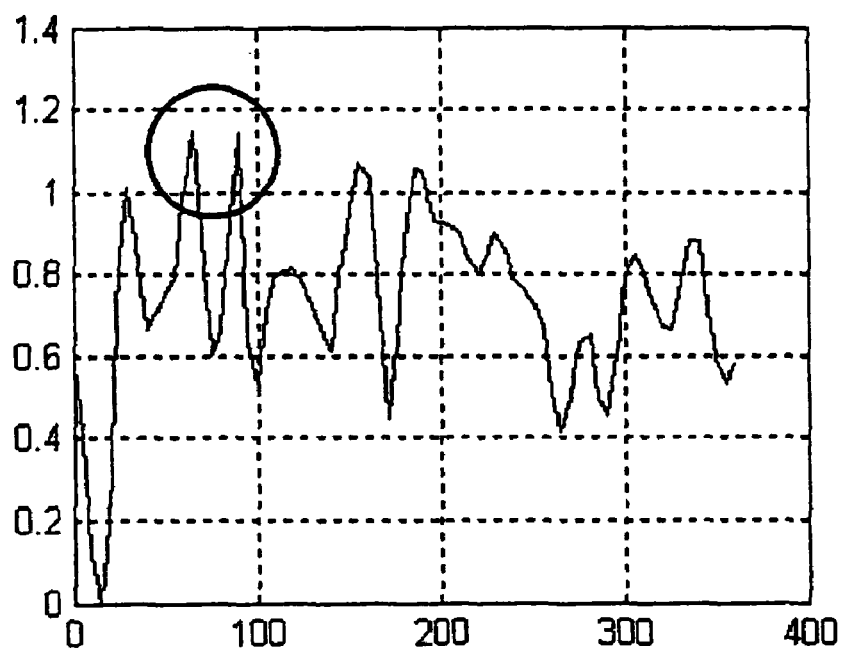

The size ratio of the second peak value to the first peak value is compared with a specified threshold value, for example, 0.9, in operation 917. If the size ratio of the second peak value to the first peak value is equal to or less than the specified threshold value, operation 918 is performed, and if the size ratio is greater than the threshold value, operation 920 is performed. The operation 917 is to more accurately estimate the direction of the speaker even when the noise source and the speaker are almost in the same direction. Referring to FIGS. 10A through 10C, this will now be explained in more detail.

At this time, an environment where the noise source is in the direction of 90 degrees, the distance between the noise source and the robot is 3.5 m, the speaker is in the direction of 90 degrees as the noise source, the distance between the speaker and the robot is 3 m, and the SNR is measured as 5.88 dB, will be explained as an example.

FIGS. 10A and 10B show the first pseudo-power spectrum obtained in a speech section and the second pseudo-power spectrum obtained in a non-speech section, respectively. The first and second pseudo-power spectra have quite similar shapes and since both the voice and noise are in the direction of 90 degrees, there is only one difference that the amplitude corresponding to 90 degrees in the first pseudo-power spectrum is a little larger that in the second pseudo-power spectrum. FIG. 10C shows the difference spectrum of the first and second pseudo-power spectra and a plurality of meaningless peak values can be seen. This corresponds to the case where the size ratio of the second peak value to the first peak value is greater than a specified threshold value in the operation 917 of FIG. 9A, and accordingly, the operation 920 of FIG. 9A is performed.

Figure 11A:
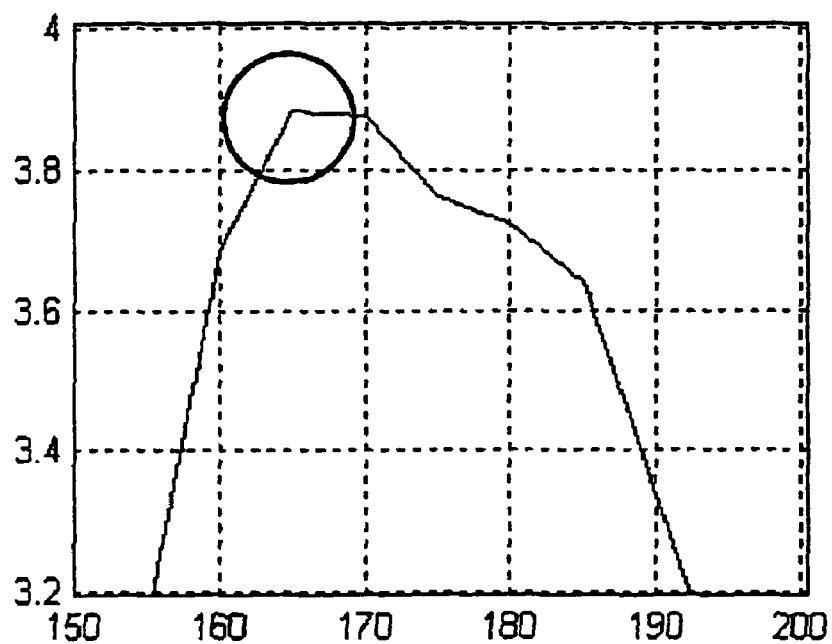
FIGS. 11A and 11B are graph explaining the meaning of operation 919 in FIG. 9.
Figure 11B:
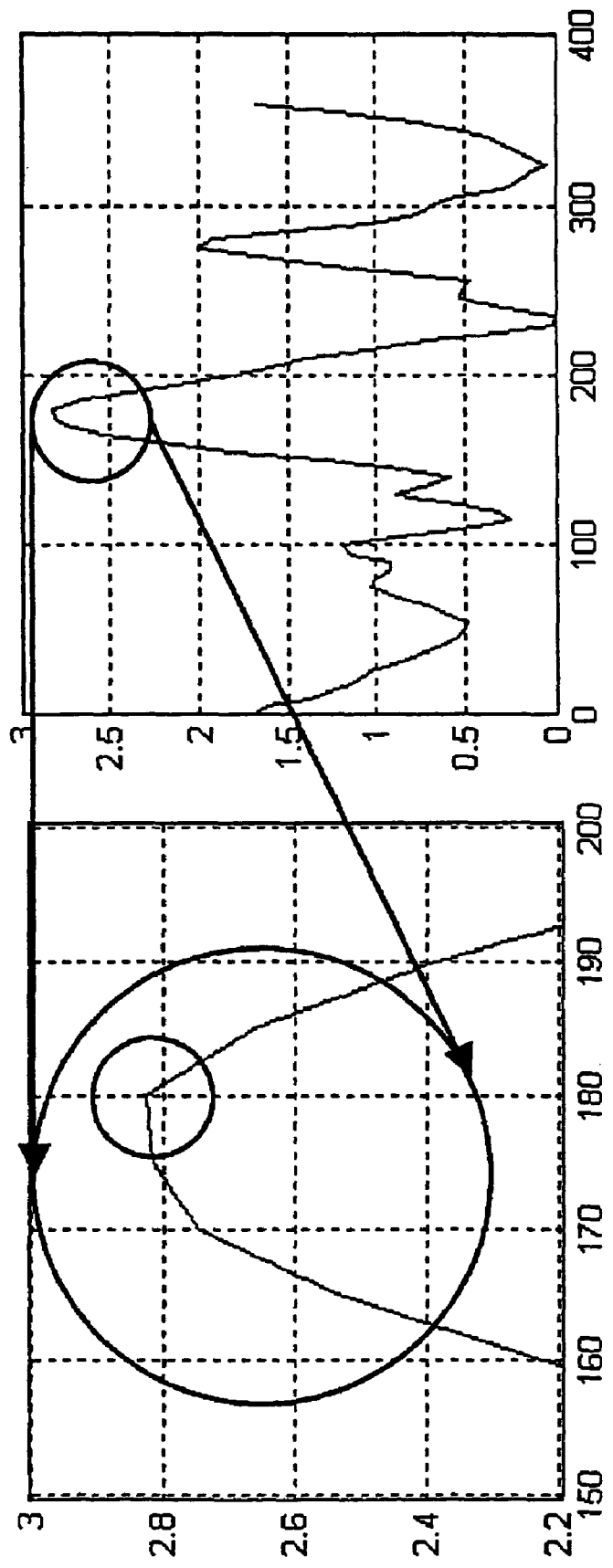

Referring to FIGS. 9A and 9B, if the result of determination in the operation 917 indicates that the size ratio of the second peak value to the first peak value is equal to or less than a specified threshold value, a peak candidate area is determined based on the direction angle corresponding to the first peak value in operation 918. In operation 919, it is determined whether or not a maximum peak value is in a peak candidate area in the first pseudo-power spectrum obtained in the speech section. If a maximum peak value is not in the peak candidate area, the operation 920 is performed and if a maximum peak value is in the peak candidate area, operation 921 is performed. The operation 919 is to accurately find the direction of the speaker even when by subtracting the second pseudo-power spectrum obtained in the non-speech section from the first pseudo-power spectrum obtained in the speech section, the shape of a peak value in the difference spectrum is greatly changed. Referring to FIGS. 11A and 11B, this will now be explained in detail.

At this time, a case where the noise source is in the direction of 90 degrees, the distance between the noise source and the robot is 3.5 m, the speaker is in the direction of 180 degrees, the distance between the speaker and the robot is 1 m, and the SNR is measured as 12.54 dB, will be explained as an example. FIG. 11A is an enlarged diagram of the difference spectrum of the first pseudo-power spectrum obtained in the speech section and the second pseudo-power spectrum obtained in the non-speech section. Since the maximum peak value, that is, the first peak value, is in 165 degrees, the peak candidate area is in 165±10 degrees, that is, between 155 degrees and 175 degrees. FIG. 11B is an enlarged diagram of a maximum peak value existing in the first pseudo-power spectrum obtained in the speech section, and the maximum peak value is not in the peak candidate area, that is, between 155 degrees and 175 degrees. This corresponds to the case where a maximum peak value is not in the peak candidate area in the first pseudo-power spectrum obtained in the speech section in the operation 919 of FIG. 9A, and the operation 920 of FIG. 9A is performed.

If the result of determination in the operation 917 indicates that the size ratio of the second peak value to the first peak value is greater than a specified threshold value, or the result of determination in the operation 919 indicates that the maximum peak value is not in the peak candidate area in the first pseudo-power spectrum obtained in the speech section, a maximum peak value in the entire area of the first pseudo-power spectrum is detected in the operation 920 of FIG. 9A, and the direction angle corresponding to the maximum peak value is determined as the direction of the speaker in the operation 922 of FIG. 9B. For example, if the size ratio of the second peak value to the first peak value is greater than a specified threshold value as shown in FIG. 10C, a maximum peak value is detected from the entire area of the first pseudo-power spectrum shown in FIG. 10A and at this time, the maximum peak value is at 90 degrees and this direction matches the direction of the speaker. That is, though it is determined by the speech section detection algorithm applied to the present invention, that the voice is spoken, if only one maximum peak value is found in the first pseudo-power spectrum, it is recognized that the direction of the voice matches the direction of the noise. As another example, if a maximum peak value is not in the peak candidate area in the first pseudo-power spectrum obtained in the speech section as in FIG. 11B, a maximum peak value is detected in the entire area of the first pseudo-power spectrum shown in FIG. 11B, and at this time the maximum peak value is in 180 degrees and this direction matches the direction of the speaker. In conclusion, the method for speaker localization according to the present embodiment can very robustly estimate the direction of a speaker irrespective of the presence of noise, and regardless of whether or not the distance of the direction of the speaker and the direction of the noise is short.

If the result of determination in the operation 919 of FIG. 9A indicates that the maximum peak value is in the peak candidate area in the first pseudo-power spectrum obtained in the speech section, the maximum peak value in the candidate area is detected in the operation 921 and the direction angle corresponding to the maximum peak value is determined as the direction of the speaker in operation 922 of FIG. 9B.

Figure 12:
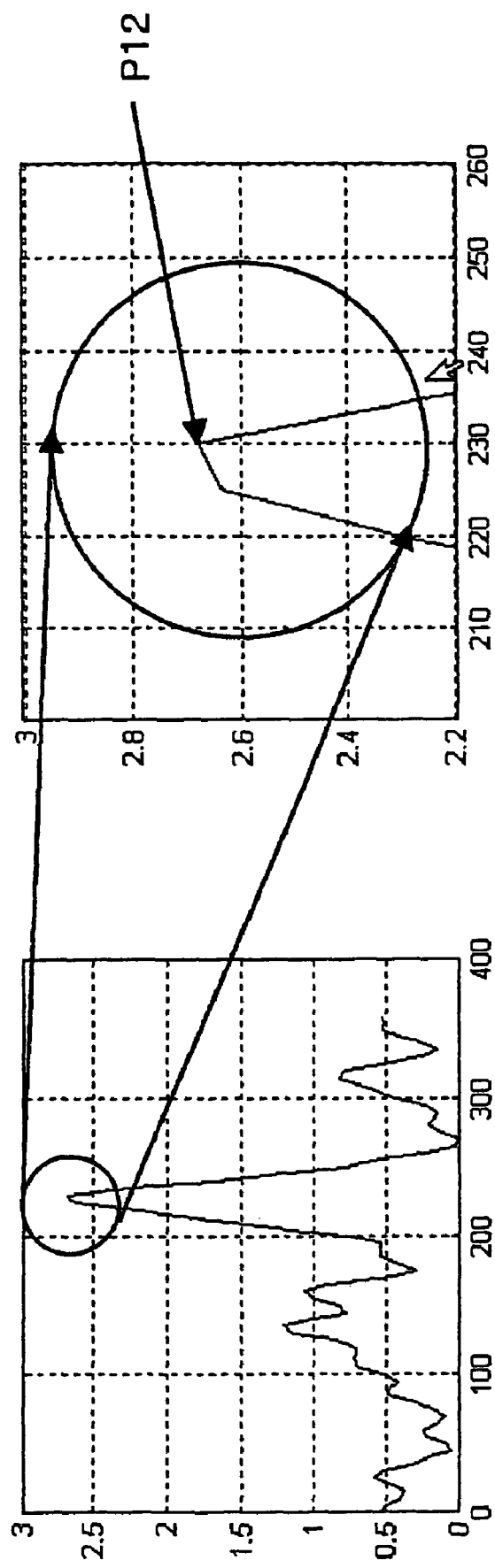
FIG. 12 is a graph showing a direction angle obtained by a method of speaker localization according to an embodiment of the present invention.

FIG. 12 is a graph showing a direction angle obtained by a preferred embodiment of a method for speaker localization according to the present invention, and is obtained by enlarging the peak value 731 shown in FIG. 7C. Referring to the enlarged graph, it can be seen that the direction angle of the speaker is 230 degrees (P12). This means a 5 degree error compared to 225 degrees in which the speaker is located. The pseudo-power spectrum obtained in the non-speech section shown in FIG. 7B has meaningless values around 225 degrees point, and when this pseudo-power spectrum is subtracted from the pseudo-power spectrum obtained in the speech section of FIG. 7A, the shape of the peak value changes and this 5 degree error occurs. Compared to the result of speaker localization based on the ordinary MUSIC algorithm in an environment where noise exists, this result is very close to the actual direction of the speaker.

Figure 13:
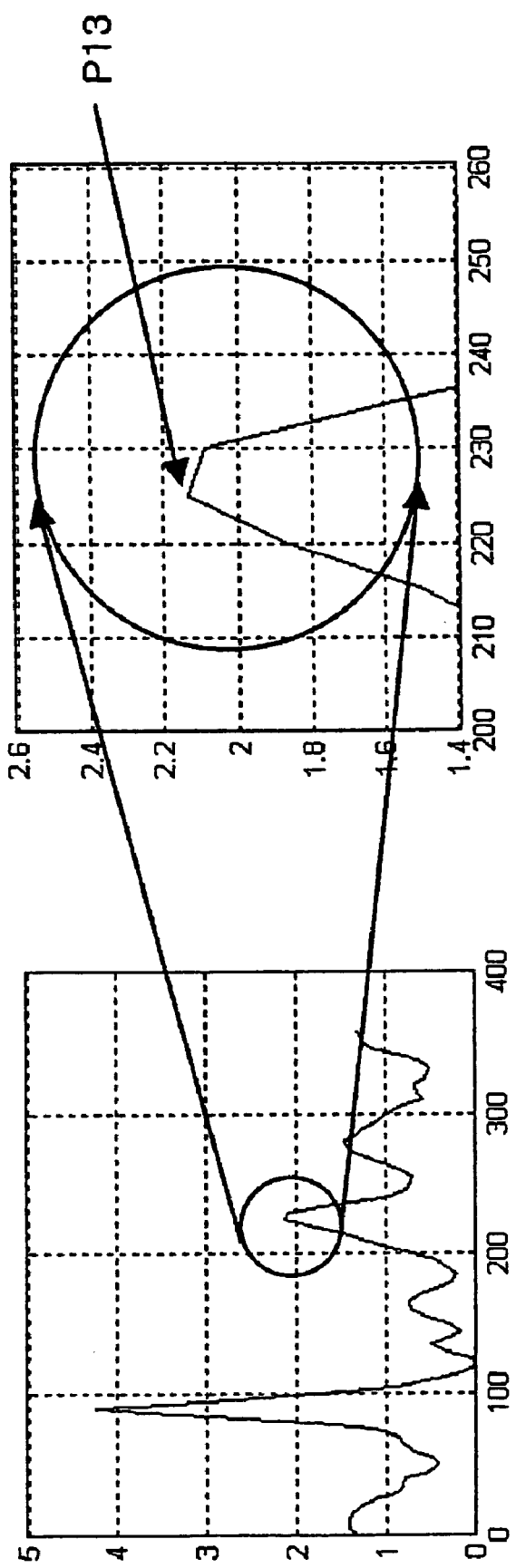
FIG. 13 is a graph showing a direction angle obtained by another method for speaker localization according to an embodiment of the present invention.

FIG. 13 is a graph showing a direction angle obtained by another method of speaker localization according to an embodiment of the present invention, and is obtained by enlarging the peak value existing in the candidate area in the first pseudo-power spectrum for the speech section of FIG. 7A, that is, in the range of 230±10 degrees. Referring to the enlarged graph, it can be seen that the direction angle of the speaker is 225 degrees (P13). This accurately matches 225 degrees in which the speaker is located.

Figure 14:
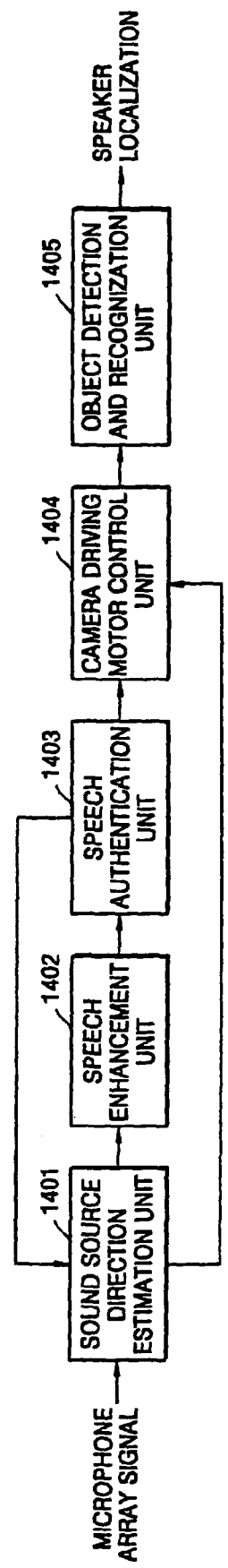
FIG. 14 is a block diagram of the structure of an automatic camera steering system employing an apparatus for speaker localization according to an embodiment of the present invention.

FIG. 14 is a block diagram of the structure of a preferred embodiment of an automatic camera steering system employing an apparatus for speaker localization according to the present invention. The automatic camera steering system comprises a sound source direction estimation unit 1401, a speech enhancement unit 1402, a speech authentication unit 1403, a camera driving motor control unit 1404, and an object detection and recognition unit 1405.

Referring to FIG. 14, the sound source direction estimation unit 1401 detects a peak value in any one of the difference spectrum of a first pseudo-power spectrum in a speech section and a second pseudo-power spectrum in a non-speech section detected from a voice signal output from a microphone array, and the first pseudo-power spectrum, and estimates the direction angle corresponding to the detected peak value as the direction of the speaker. At this time, direction angle information is provided to the speech enhancement unit 1402 and the camera driving motor control unit 1404.

Among the output signals of the microphone array, the speech enhancement unit 1402 receives the output signal of a microphone located closest to the direction angle output from the sound source direction estimation unit 1401 and removes noise. The method for removing noise by the speech enhancement unit 1402 is disclosed in detail by an article by Nam-Soo Kim and Joon-Hyuk Chang, "Spectral Enhancement Based on Global Soft Decision," IEEE Signal Processing Letters, vol. 7, No. 5, pp. 108-110, 2000, an article by Vladimir I, Shin and Doh-Suk Kim, "Speech Enhancement Using Improved Global Soft Decision," in Proc. Europ. Conf. on Speech Communication and Technology, 2001, and an article by Yariv Ephraim and David Malah, "Speech Enhancement Using a Minimum Mean-Square Error Short-Time Spectral Amplitude Estimator," IEEE Trans. Acoustics, Speech, and Signal Processing, Vol. ASSP-32, No. 6, pp. 1109-1121, 1984.

The speech authentication unit 1403 recognizes whether or not a meaningful voice is spoken, by using the voice signal which is output from the speech enhancement unit 1402 and in which noise is removed. If it is determined that a meaningful voice is spoken, the speech authentication unit 1403 enables the camera driving motor control unit 1404. Otherwise, it controls the sound source direction estimation unit 1401 in order to newly receive a signal output form the microphone array.

When it is determined in the speech authentication unit 1403 that a meaningful voice is spoken, the camera driving motor control unit 1404 rotates a camera driving motor (not shown) to the direction angle provided by the sound source direction estimation unit 1401.

The object detection and recognition unit 1405 analyzes an image output from a camera (not shown) and detects a meaningful object such as, by way of a non-limiting example, the body of a person.

In addition, a command is sent to the camera driving motor control unit 1404 so that the central point of the meaningful object (e.g., body) of the detected person is located at the center of an image, and a command for adjusting the zoom function of the camera is sent so that all of the body of the detected person is included in the image.

Figure 15:
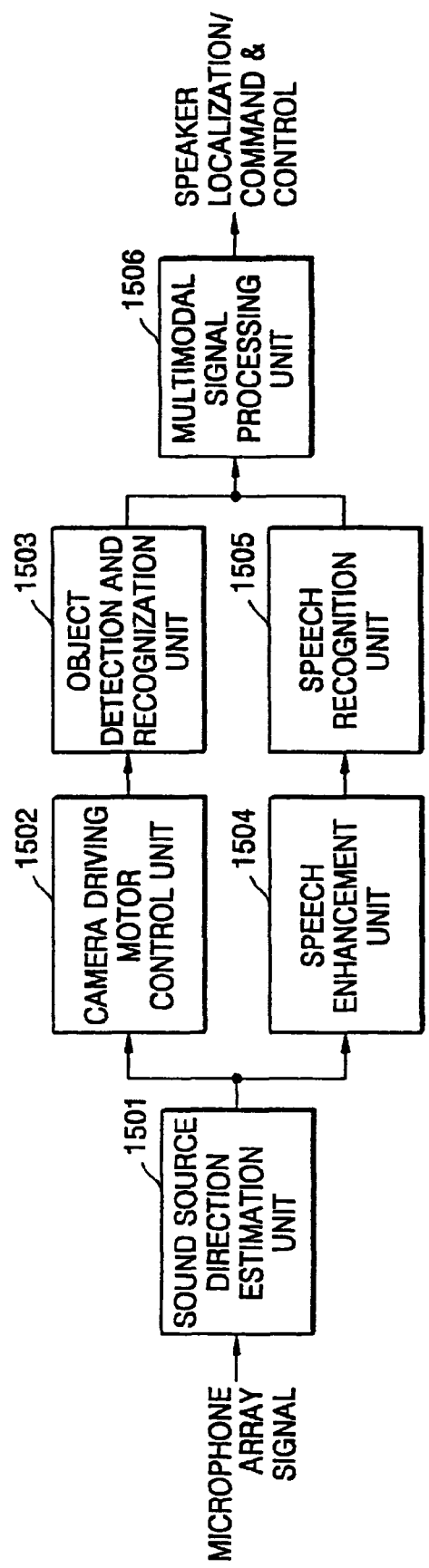
FIG. 15 is a block diagram of the structure of an automatic camera steering system employing an apparatus for speaker localization according to an embodiment of the present invention.

FIG. 15 is a block diagram of the structure of another automatic camera steering system employing an apparatus for speaker localization according to an embodiment of the present invention. The automatic camera steering system includes a sound source direction estimation unit 1501, a camera driving motor control unit 1502, an object detection and recognition unit 1503, a speech enhancement unit 1504, a speech recognition unit 1505, and a multimodal signal processing unit 1506. Here, since the operations of the sound source direction estimation unit 1501, the camera driving motor control unit 1502, the object detection and recognition unit 1503, and the speech enhancement unit 1504 are the same as in the embodiment shown in FIG. 14, the detailed explanation will be omitted, and components which differ will be explained.

Referring to FIG. 15, the speech recognition unit 1505 recognizes whether or not a meaningful voice is spoken, by using the voice signal which is output from the speech enhancement unit 1504 and in which noise is removed. The speech recognition unit 1505 and the direction information from the sound source direction estimation unit 1501 converts the recognized speech into text information and outputs the text information.

By combining the image information output from the camera driving motor control unit 1502 and the object detection and recognition unit 1503, the text information output from the speech enhancement unit 1504 and the speech recognition unit 1505, the multimodal signal processing unit 1506 estimates the location of the speaker, and understand and executes a command given by the speaker. A plurality of commands given by a plurality of speakers can be understood, and a schedule is set up and sequentially executed.

Embodiments of the present invention may be embodied in a code, which can be read by a computer, on a computer readable recording medium. The computer readable recording medium includes all kinds of recording apparatuses on which computer readable data are stored. The computer readable recording media includes ROMs, RAMs, CD-ROMs, magnetic tapes, hard disks, floppy disks, flash memories, and optical data storage devices. Also, the computer readable recording media can be scattered on computer systems connected through a network and can store and execute a computer readable code in a distributed mode. Also, functional programs, codes and code segments to implement embodiments of the present invention can be inferred by those of ordinary skill in the relevant art.

Meanwhile, in order to evaluate the performance of the method of speaker localization according to an embodiment of the present invention, the following experiments were conducted.

In a laboratory where reverberation is small, signals of 'Sebastian' spoken by four male speakers and four female speakers were used as sound source signal and fan noise was used as noise source. Measurement was performed at each 1 m distance interval from 1 m to 5 m distances, and at each 45 degree angle interval from 0 degree to 360 degrees. However, due to the restrictions of the experiment environment, in the case of the 5 m distance, measurement was performed only in four direction angles of 45, 135, 225, and 315 degrees. The following tables 2 through 4 show the experiment results with respect to average SNRs of the voice signals to fan noises measured from the location of the robot. Table 2 shows the result when the SNR was 12.54 dB, table 3 shows the result when the SNR was 5.88 dB, and table 4 shows the result when the SNR was 1.33 dB.

TABLE 2

| Error | Estimating speaker direction by highest peak | | | | Estimating speaker direction by method of FIG. 2 | | | |
|---|---|---|---|---|---|---|---|---|
| | 0° | 5° | 10° | over 10° | 0° | 5° | 10° | over 10° |
| Number of events | 259 | 24 | 4 | 1 | 260 | 24 | 4 | 0 |
| Average error | | 1.06° | | | | 0.56° | | |
| Distribution | | 76.48 | | | | 3.47 | | |
| Standard deviation | | 8.75 | | | | 1.86 | | |
| Success rate   Allowable error of 0° | | 89.93% | | | | 90.28% | | |
| Allowable error of 5° | | 98.26% | | | | 98.61% | | |
| Allowable error of 10° | | 99.65% | | | | 100.0% | | |

TABLE 3

| Error | Estimating speaker direction by highest peak | | | | Estimating speaker direction by method of FIG. 2 | | | |
|---|---|---|---|---|---|---|---|---|
| | 0° | 5° | 10° | over 10° | 0° | 5° | 10° | over 10° |
| Number of events | 208 | 16 | 2 | 62 | 259 | 20 | 8 | 1 |
| Average error | | 22.33° | | | | 0.69° | | |
| Distribution | | 2636.11 | | | | 5.90 | | |
| Standard deviation | | 51.34 | | | | 1.86 | | |
| Success rate   Allowable error of 0° | | 72.22% | | | | 89.93% | | |
| Allowable error of 5° | | 77.78% | | | | 96.88% | | |
| Allowable error of 10° | | 78.48% | | | | 99.65% | | |
| Number of events | 259 | 24 | 4 | 1 | 260 | 24 | 4 | 0 |
| Average error | | 1.06° | | | | 0.56° | | |
| Distribution | | 76.48 | | | | 3.47 | | |
| Standard deviation | | 8.75 | | | | 1.86 | | |
| Success rate   Allowable error of 0° | | 89.93% | | | | 90.28% | | |
| Allowable error of 5° | | 98.26% | | | | 98.61% | | |
| Allowable error of 10° | | 99.65% | | | | 100.0% | | |

TABLE 4

| | Estimating speaker direction by highest peak | | | | Estimating speaker direction by method of FIG. 2 | | | |
|---|---|---|---|---|---|---|---|---|
| Error | 0° | 5° | 10° | over 10° | 0° | 5° | 10° | over 10° |
| Number of events | 153 | 5 | 0 | 130 | 264 | 16 | 8 | 0 |
| Average error | | 44.79° | | | | 0.56° | | |
| Distribution | | 5561.63 | | | | 4.17 | | |
| Standard deviation | | 74.58 | | | | 2.04 | | |
| Success rate Allowable error of 0° | | 53.13% | | | | 91.67% | | |
| Allowable error of 5° | | 54.86% | | | | 97.22% | | |
| Allowable error of 10° | | 54.86% | | | | 100.0% | | |

According to embodiments of the present invention, a speech section can be accurately found in an environment where the noise level is high, and in addition, the direction of a speaker who spoke the voice can be accurately found. Furthermore, even when the direction of noise almost matches the direction of a speaker, the direction of the speaker can be accurately found. Accordingly, even in an indoor environment where there are a variety of noise sources such as a TV, a radio, an audio system, and a refrigerator, if a user calls the name of a robot which is registered in advance, at a distance of several meters, the robot can accurately find the direction of the user, that is, the speaker. The method and apparatus for speaker localization according to embodiments the present invention can be applied to all systems that drive a camera in the direction where sound is generated, such as a camera monitoring system or a web camera, as well as an autonomously traveling mobile robot, and therefore can greatly increase the added value of each system.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

What is claimed is:

1. An apparatus for speaker localization comprising:
 a difference spectrum obtaining section which obtains a difference spectrum of a first pseudo-power spectrum for a speech section and a second pseudo-power spectrum for a non-speech section detected in a voice signal output from a microphone array; and
 a speaker direction estimation section which detects a peak value in any one of the difference spectrum and the first pseudo-power spectrum, and estimates the direction of a speaker based on the direction angle corresponding to the detected peak value;
 wherein the difference spectrum obtaining section includes:
 a speech/non-speech section detection unit which detects a speech section from the voice signal, and by using the speech section, detects a non-speech section;
 a steering vector database which stores each steering vector that is obtained by using a transfer function between an actual sound source and the microphone array;
 a first spectrum obtaining unit which obtains a first pseudo-power spectrum by projecting the steering vector onto a basis vector in a noise subspace obtained for the speech section;
 a second spectrum obtaining unit which obtains a second pseudo-power spectrum by projecting the steering vector onto a basis vector in a noise subspace obtained for the non-speech section; and
 a subtraction unit which obtains the difference spectrum by subtracting the second pseudo-power spectrum from the first pseudo-power spectrum.

2. The apparatus of claim 1, wherein the speech/non-speech section detection unit detects the speech section by using a first parameter which is a probability value obtained from a single frame voice presence probability, a second parameter which is a number of successive frames determined as speech, a third parameter which is a number of successive frames determined as non-speech, a fourth parameter which is the ratio of the number of frames determined as speech and the number of frames determined as non-speech, and a fifth parameter which is the number of total frames in a determined speech section.

3. The apparatus of claim 2, further comprises that threshold values of the first through fifth parameters are adaptively adjusted with respect to a signal-to-noise ratio (SNR).

4. The apparatus of claim 3, wherein the threshold values of the first through fifth parameters are tuned in advance in a clean environment and in an environment where the SNR is a specified upper limit value, respectively, and then, for a range where the SNR is in the middle, threshold values obtained through linear interpolation.

5. The apparatus of claim 1, wherein the transfer function to obtain the steering vector is measured in each specified angle interval at a location at a specified distance from the mobile robot on which the microphone array is installed.

6. The apparatus of claim 1, wherein the speaker direction estimation unit detects a maximum peak value in the difference spectrum, and estimates the direction angle corresponding to the detected maximum peak value, as the direction of a speaker.

7. The apparatus of claim 1, wherein, when a size ratio of first and second peak values detected in the difference spectrum is greater than a specified threshold value, the speaker direction estimation unit detects the maximum peak value in the entire area of the first pseudo-power spectrum.

8. The apparatus of claim 1, wherein, when a size ratio of first and second peak values detected in the difference spectrum is less than or equal to a specified threshold value, and a maximum peak value is not in a candidate area in the first pseudo-power spectrum, the speaker direction estimation unit detects the maximum peak value in the entire area of the first pseudo-power spectrum.

9. The apparatus of claim 1, wherein, when a size ratio of first and second peak values detected in the difference spectrum is less than or equal to a specified threshold value, and a maximum peak value is in a candidate area in the first pseudo-power spectrum, the speaker direction estimation unit detects the maximum peak value in the candidate area of the first pseudo-power spectrum.

10. The apparatus for speaker localization of claim 1, further comprises that a candidate area includes the direction angle ±10 degrees corresponding to a peak value found in the difference spectrum.

11. The apparatus of claim 1, wherein the speech/non-speech section detection unit detects a speech section, and selects and detects a plurality of samples preceding the speech section as a non-speech section.

12. A method of speaker localization comprising:
 obtaining, performed by a processing device, a difference spectrum of a first pseudo-power spectrum for a speech section and a second pseudo-power spectrum for a non-speech section detected in a voice signal output from a microphone array; and detecting a peak value in any one of the obtained difference spectrum and the first pseudo-power spectrum, and estimating the direction of a speaker based on the direction angle corresponding to the detected peak value;

wherein the obtaining the difference spectrum includes:

detecting a speech section from the voice signal, and by using the speech section, detecting a non-speech section;

generating a database by storing each steering vector that is obtained by using a transfer function between an actual sound source and the microphone array;

obtaining a first pseudo-power spectrum by projecting the steering vector onto a basis vector in a noise subspace obtained for the speech section, and obtaining a second pseudo-power spectrum by projecting the steering vector onto a basis vector in a noise subspace obtained for the non-speech section; and obtaining the difference spectrum of the first and second pseudo-power spectra.

13. The method of claim 12, wherein in the detecting a speech section, the speech section is detected by using a first parameter which is a probability value obtained from a single frame voice presence probability, a second parameter which is a number of successive frames determined as speech, a third parameter which is a number of successive frames determined as non-speech, a fourth parameter which is the ratio of the number of frames determined as speech and the number of frames determined as non-speech, and a fifth parameter which is the number of total frames in the determined speech section.

14. The method of claim 13, further comprises that threshold values of the first through fifth parameters are adaptively adjusted with respect to a signal-to-noise ratio (SNR).

15. The method of claim 14, wherein the threshold values of the first through fifth parameters are tuned in advance in a clean environment and in an environment where the SNR is a specified upper limit value, respectively, and then, for a range where the SNR is in the middle, threshold values obtained through linear interpolation.

16. The method of claim 12, wherein the transfer function to obtain the steering vector is measured in each specified angle interval at a location at a specified distance from the mobile robot on which the microphone array is installed.

17. The method of claim 12, wherein the estimating the direction of a speaker includes:

detecting a first peak value and a second peak value in a difference spectrum;

comparing a size ratio of the first peak value and the second peak value with a specified threshold value; and detecting the peak value in the entire area of the first pseudo-power spectrum when the size ratio of the first and second peak values is greater than a specified threshold value.

18. The method of claim 12, wherein the estimating the direction of a speaker includes:

detecting a first peak value and a second peak value in a difference spectrum;

comparing a size ratio of the first peak value and the second peak value with a specified threshold value; and determining a candidate area by using the first peak value when the size ratio of the first and second peak values is equal to or less than a specified threshold value; determining whether a peak value is in the candidate area in the first pseudo-power spectrum;

detecting the peak value in the entire area of the first pseudo-power spectrum when the peak value is not in the candidate area; and detecting a peak value in the candidate area of the first pseudo-power spectrum when the peak value is in the candidate area.

19. The method of speakers localization of claim 12, further comprises that a candidate area includes the direction angle ±10 degrees corresponding to a peak value found in the difference spectrum.

20. The method of claim 12, wherein in the detecting a speech section, the speech section is detected and then a plurality of samples preceding the speech section are selected, and then the plurality of samples are detected as the non-speech section.

21. A non-transitory computer readable recording medium encoded with processing instructions for causing a computer to perform a method of speaker localization, the method comprising:

obtaining the difference spectrum of a first pseudo-power spectrum for a speech section and a second pseudo-power spectrum for a non-speech section detected in a voice signal output from a microphone array; and detecting a peak value in any one of the obtained difference spectrum and the first pseudo-power spectrum, and estimating the direction of a speaker based on the direction angle corresponding to the detected peak value;

wherein the obtaining the difference spectrum includes:

detecting a speech section from the voice signal, and by using the speech section, detecting a non-speech section;

generating a database by storing each steering vector that is obtained by using a transfer function between an actual sound source and the microphone array;

obtaining a first pseudo-power spectrum by projecting the steering vector onto a basis vector in a noise subspace obtained for the speech section, and obtaining a second pseudo-power spectrum by projecting the steering vector onto a basis vector in a noise subspace obtained for the non-speech section; and obtaining the difference spectrum of the first and second pseudo-power spectra.

22. An automatic camera steering system comprising:

a speaker direction estimation unit which detects a peak value in any one of a difference spectrum of a first pseudo-power spectrum for a speech section and a second pseudo-power spectrum for a non-speech section detected in a voice signal output from a microphone array, and the first pseudo-power spectrum, and which estimates the direction angle corresponding to the detected peak value, as the direction of a speaker; and a driving motor control unit which controls a camera driving motor according to the estimated direction of the speaker;

wherein the difference spectrum obtaining section includes:

a speech/non-speech section detection unit which detects a speech section from the voice signal, and by using the speech section, detects a non-speech section;

a steering vector database which stores each steering vector that is obtained by using a transfer function between an actual sound source and the microphone array;

a first spectrum obtaining unit which obtains a first pseudo-power spectrum by projecting the steering vector onto a basis vector in a noise subspace obtained for the speech section;

a second spectrum obtaining unit which obtains a second pseudo-power spectrum by projecting the steering vector onto a basis vector in a noise subspace obtained for the non-speech section; and a subtraction unit which obtains the difference spectrum by subtracting the second pseudo-power spectrum from the first pseudo-power spectrum.

23. The automatic camera steering system of claim 22, further comprises that a candidate area includes the direction angle ±10 degrees corresponding to a peak value found in the difference spectrum.

24. The automatic camera steering system of claim 22, wherein the speech section is a section where there are both voice and noise, and the non-speech section is regarded as a section where there is only noise.

25. The automatic camera steering system of claim 22, wherein, when a speech section is detected, a first specified number of samples preceding the speech section are jumped over and a second specified number of samples preceding the first specified number of samples are set as a non-speech section.

26. The automatic camera steering system of claim 22, wherein, to detect a speech section, an algorithm for single frame voice activity detection probability (SFVAD_P) indicating that there is voice in a signal frame is used, multiple frames are checked, and the SFVAD algorithm being based on a signal-to-noise ration (SNR).

27. The automatic camera steering system of claim 22, wherein the first and second pseudo-power spectra are detected using a MUSIC algorithm defined by the following equations 9 and 10:

$$P(\theta, k) = \frac{a^H(\theta, k)a(\theta, k)}{a^H(\theta, k)E_{Noise}E_{Noise}^H a(\theta, k)} \tag{9}$$

$$P(\theta) = \frac{1}{N_K} \sum_{k \in K}^{N_K} P(\theta, k). \tag{10}$$

28. The automatic camera steering system of claim 22, further comprises that first through fifth parameters are used in detecting a speech section.

29. The automatic camera steering system of claim 22, further comprises that the respective first through fifth parameters are a probability value obtained from SFVAD, a number of successive frames determined as speech, a number of successive frames determined as non-speech, a ratio of the number of frames determined as speech to the number of frames determined as non-speech in determined speech section, and a number of total frames in determined speech section.

30. The automatic camera steering system of claim 22, further comprises that, when a size ratio of first and second peak values detected in the difference spectrum is greater than the specified threshold value, the speaker direction estimation unit detects the maximum peak value in the entire area of the first pseudo-power spectrum.

31. The automatic camera steering system of claim 22, further comprises that, when a size ratio of first and second peak values detected in the difference spectrum is less than or equal to the specified threshold value, and a peak value is not in the candidate area in the first pseudo-power spectrum, the speaker direction estimation unit detects the maximum peak value in the entire area of the first pseudo-power spectrum.

32. The automatic camera steering system of claim 22, further comprises that, when a size ratio of first and second peak values detected in the difference spectrum is less than or equal to the specified threshold value, and a peak value is in the candidate area in the first pseudo-power spectrum, the speaker direction estimation unit detects the maximum peak value in the candidate area of the first pseudo-power spectrum.

* * * * *